US012330110B2

(12) United States Patent
Monteith

(10) Patent No.: US 12,330,110 B2
(45) Date of Patent: Jun. 17, 2025

(54) EMISSION CANISTER SYSTEM FOR A HVAC and R SYSTEM

(71) Applicant: Johnson Controls Tyco IP Holdings LLP, Milwaukee, WI (US)

(72) Inventor: Maccrae William Monteith, York, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/234,823

(22) Filed: Aug. 16, 2023

(65) Prior Publication Data

US 2023/0390690 A1    Dec. 7, 2023

Related U.S. Application Data

(63) Continuation of application No. 16/650,349, filed as application No. PCT/US2018/052937 on Sep. 26, 2018, now Pat. No. 11,738,298.

(Continued)

(51) Int. Cl.
*B01D 53/04* (2006.01)
*B01D 53/26* (2006.01)
(Continued)

(52) U.S. Cl.
CPC ......... *B01D 53/04* (2013.01); *B01D 53/0415* (2013.01); *B01D 53/0446* (2013.01);
(Continued)

(58) Field of Classification Search
CPC .......... B01D 53/04; B01D 53/0415; B01D 53/0446; B01D 53/0454; B01D 53/261;
(Continued)

(56) References Cited

U.S. PATENT DOCUMENTS 3,145,544 A * 8/1964 Weller ............... F25B 43/043
62/85
3,410,106 A * 11/1968 Brockie ............. F25B 43/043
62/195

(Continued)

FOREIGN PATENT DOCUMENTS

CN    1192705 A    9/1998
CN    101119785 A    2/2008
(Continued)

OTHER PUBLICATIONS

International Search Report and Written Opinion for PCT Application No. PCT/US2018/052937, mailed Mar. 27, 2019, 20 pgs.
(Continued)

*Primary Examiner* — Frank M Lawrence, Jr.
(74) *Attorney, Agent, or Firm* — Fletcher Yoder, P.C.

(57) ABSTRACT

The present disclosure relates to a purge system for a vapor compression system, where the purge system includes an emission canister configured to receive a gas flow. The gas flow includes a mixture of non-condensable gases and refrigerant of the vapor compression system. An adsorbent material is disposed within the emission canister and configured to adsorb the refrigerant and enable the non-condensable gases to flow toward an exhaust of the emission canister, where the adsorbent material is a silica gel.

20 Claims, 19 Drawing Sheets

Related U.S. Application Data

(60) Provisional application No. 62/564,085, filed on Sep. 27, 2017.

(51) Int. Cl.
  *F25B 43/04* (2006.01)
  *B01D 53/14* (2006.01)
  *F25B 45/00* (2006.01)

(52) U.S. Cl.
  CPC ....... *B01D 53/0454* (2013.01); *B01D 53/261* (2013.01); *F25B 43/04* (2013.01); *B01D 53/0462* (2013.01); *B01D 53/1425* (2013.01); *B01D 2253/102* (2013.01); *B01D 2253/106* (2013.01); *B01D 2257/102* (2013.01); *B01D 2257/40* (2013.01); *B01D 2257/504* (2013.01); *B01D 2257/702* (2013.01); *B01D 2257/80* (2013.01); *B01D 2259/402* (2013.01); *F25B 45/00* (2013.01)

(58) Field of Classification Search
  CPC ............ B01D 53/0462; B01D 53/1425; B01D 2253/102; B01D 2253/106; B01D 2257/102; B01D 2257/40; B01D 2257/504; B01D 2257/702; B01D 2257/80; B01D 2259/402; B01D 2257/206; B01D 53/30; B01D 2257/20; F25B 43/04; F25B 45/00; Y02C 20/40
  USPC ................................... 96/109, 121, 126, 152
  See application file for complete search history.

(56) References Cited

U.S. PATENT DOCUMENTS

| | | | |
|---|---|---|---|
| 4,717,401 A | 1/1988 | Lupoli et al. | |
| 4,984,431 A * | 1/1991 | Mount | F25B 43/04 62/85 |
| 5,081,851 A * | 1/1992 | Murray | F25B 15/02 62/85 |
| 5,089,048 A | 2/1992 | Knoblauch et al. | |
| 5,187,953 A * | 2/1993 | Mount | F25B 43/04 62/195 |
| 5,245,839 A | 9/1993 | Chang et al. | |
| 5,261,246 A * | 11/1993 | Blackmon | F25B 43/043 62/85 |
| 5,313,805 A | 5/1994 | Blackmon et al. | |
| 5,401,706 A | 3/1995 | Fischer | |
| 5,425,242 A | 6/1995 | Dunne et al. | |
| 5,441,716 A | 8/1995 | Rockenfeller | |
| 5,515,690 A | 5/1996 | Blackmon et al. | |
| 5,517,825 A | 5/1996 | Manz et al. | |
| 5,573,665 A | 11/1996 | Frommer et al. | |
| 5,592,826 A | 1/1997 | Sagar et al. | |
| 5,806,322 A | 9/1998 | Cakmakci et al. | |
| 5,861,050 A | 1/1999 | Pittel et al. | |
| 5,910,160 A * | 6/1999 | Cakmakci | B01D 53/04 62/495 |
| 6,449,962 B1 | 9/2002 | Takemasa et al. | |
| 6,478,849 B1 | 11/2002 | Taylor et al. | |
| 11,073,315 B2 * | 7/2021 | Jandal | F25B 43/043 |
| 2003/0192333 A1 | 10/2003 | Heiden et al. | |
| 2004/0123622 A1 | 7/2004 | Yuzawa et al. | |
| 2012/0145006 A1 | 6/2012 | Schroeder et al. | |
| 2013/0216444 A1 | 8/2013 | Hartvigsen et al. | |
| 2013/0239807 A1 | 9/2013 | Weist, Jr. et al. | |
| 2014/0165828 A1 | 6/2014 | Martin et al. | |
| 2017/0307269 A1 * | 10/2017 | Gu | F25B 43/003 |
| 2018/0015408 A1 | 1/2018 | Yu et al. | |
| 2018/0104645 A1 | 4/2018 | Vertriest | |
| 2019/0113262 A1 | 4/2019 | Ma et al. | |

FOREIGN PATENT DOCUMENTS

| | | |
|---|---|---|
| CN | 101151095 A | 3/2008 |
| CN | 101701900 A | 5/2010 |
| CN | 105202827 A | 12/2015 |
| CN | 205672740 U | 11/2016 |
| DE | 3502971 A1 | 5/1986 |
| DE | 29720026 U1 | 4/1998 |
| DE | 102004028442 A1 | 12/2005 |
| JP | 849104876 A | 10/1974 |
| JP | S5011864 B1 | 5/1975 |
| JP | H10587423 A | 4/1993 |
| JP | H07120111 A | 5/1995 |
| JP | H0974658 A | 3/1997 |
| JP | H1194393 A | 4/1999 |
| JP | 2000074511 A | 3/2000 |
| JP | 2000229213 A | 8/2000 |
| JP | 2001174108 A | 6/2001 |
| JP | 2005077042 A | 3/2005 |
| JP | 2007185617 A | 7/2007 |
| JP | 2009533641 A | 9/2009 |
| JP | 2010043758 A | 2/2010 |
| JP | 2011133191 A | 7/2011 |
| JP | 5606732 B2 | 10/2014 |
| JP | 2016098477 A | 5/2016 |
| JP | 2016123915 A | 7/2016 |
| JP | 2017508121 A | 3/2017 |
| KR | 20110116493 A | 10/2011 |
| KR | 20130119973 A | 11/2013 |
| KR | 20150004181 U | 11/2015 |
| KR | 20160055654 A | 5/2016 |

OTHER PUBLICATIONS

Japanese Office Action for JP Application No. 2020-517844, dated Jun. 18, 2021, 4 pgs.
Korean Office Action for KR Application No. 10-2020-7011675, dated Jul. 19, 2021, 8 pgs.
Japanese Office Action for JP Application No. 2020-518062, dated May 21, 2021, 5 pgs.
Korean Office Action for KR Application No. 10-2020-7011785, dated Jul. 19, 2021, 6 pgs.
Japanese Office Action for JP Application No. 2020-518060, dated May 21, 2021, 5 pgs.
Korean Office Action for KR Application No. 10-2020-7011744, dated Jul. 19, 2021, 11 pgs.
Chinese Office Action for CN Application No. 201880074561.2, dated Aug. 24, 2021, 11 pgs.
Chinese Office Action for CN Application No. 201880076149.4, dated Sep. 1, 2021, 20 pgs.
Chinese Office Action for CN Application No. 201880073617.2, dated Sep. 17, 2021, 10 pgs.
Korean Office Action for KR Application No. 10-2020-7011675, dated Nov. 30, 2021, 2 pgs.
Korean Office Action for KR Application No. 10-2020-7011785, dated Nov. 30, 2021, 2 pgs.
Korean Office Action for KR Application No. 10-2020-7011744, dated Nov. 30, 2021, 2 pgs.
Japanese Office Action for JP Application No. 2020-517844, dated Feb. 2, 2022, 4 pgs.
Japanese Office Action for JP Application No. 2020-518062, dated Jan. 19, 2022, 4 pgs.
Japanese Office Action for JP Application No. 2020-518060, dated Jan. 19, 2022, 3 pgs.
Chinese Office Action for CN Application No. 201880076149.4, dated Feb. 14, 2022, 21 pgs.
Chinese Office Action for CN Application No. 201880074561.2, dated Feb. 16, 2022, 8 pgs.
Zhaoxin Lin et al., Air Pollution Control Engineering, May 31, 1991, p. 466, Higher Education Press.
Yining Wu et al., Principles of Basic Environmental Chemical Engineering, Jun. 30, 2017, pp. 225-226, Harbin Institute of Technology Press.

(56) References Cited

OTHER PUBLICATIONS

Korean Office Action for KR Application No. 10-2022-7006788, dated Jun. 2, 2022, 9 pgs.
European Office Action for EP Application No. 18783348.8, dated Feb. 8, 2023, 6 pgs.
European Office Action for EP Application No. 18783345.4, dated Apr. 4, 2023, 10 pgs.
Korean Office Action for KR Application No. 10-2023-7015370, dated Aug. 16, 2023, 8 pgs.
Japanese Office Action for JP Application No. 2022-090056, dated Jun. 26, 2023, 5 pgs.

\* cited by examiner

EMISSION CANISTER SYSTEM FOR A HVAC and R SYSTEM

CROSS-REFERENCE TO RELATED APPLICATIONS

This application is a continuation of U.S. patent application Ser. No. 16/650,349, entitled "EMISSION CANISTER SYSTEM FOR A HVAC&R SYSTEM," filed Mar. 24, 2020, which is a U.S. National Stage Application of PCT International Application No. PCT/US2018/052937, entitled "EMISSION CANISTER SYSTEM FOR A HVAC&R SYSTEM," filed Sep. 26, 2018, which claims priority from and the benefit of U.S. Provisional Application No. 62/564,085, entitled "EMISSION CANISTER SYSTEM FOR A HVAC&R SYSTEM," filed Sep. 27, 2017, each of which is herein incorporated by reference in their entirety for all purposes.

BACKGROUND

This disclosure relates generally to heating, ventilating, air conditioning, and refrigeration (HVAC&R) systems. Specifically, the present disclosure relates to emission canisters systems for HVAC&R units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A heating, ventilating, air conditioning, and refrigeration (HVAC&R) system may be used to thermally regulate (e.g., heat or cool) an environment (e.g., a building, home, or other structure). The HVAC&R system may include a vapor compression system, which includes heat exchangers such as a condenser and an evaporator, which transfer thermal energy (e.g., heat) between the HVAC&R system and the environment. A refrigerant may be used as a heat transfer fluid within the heat exchangers of the vapor compression system. In many cases (e.g., when using low pressure refrigerant), non-condensable gases (e.g., air, nitrogen) may accumulate within the vapor compression system and mix with the refrigerant, which may decrease the operational efficiency of the vapor compression system.

To remove the non-condensable gases from the vapor compression system, a purge system including an emission canister system may be included in the vapor compression system. The emission canister system may be configured to separate and remove the non-condensable gases from the vapor compression system. That is, the emission canister may separate the non-condensable gases from the refrigerant of the vapor compression system and collect the refrigerant that is separated from the non-condensable gases. Unfortunately, existing emission canisters systems may become quickly saturated with refrigerant and/or may inefficiently remove the refrigerant from within the emission canisters. Furthermore, existing emissions canisters may inefficiently remove the refrigerant from the non-condensable gases.

SUMMARY

The present disclosure relates to a purge system for a vapor compression system, where the purge system includes an emission canister configured to receive a gas flow. The gas flow includes a mixture of non-condensable gases and refrigerant of the vapor compression system. An adsorbent material is disposed within the emission canister and configured to adsorb the refrigerant and enable the non-condensable gases to flow toward an exhaust of the emission canister, where the adsorbent material is a silica gel.

The present disclosure also relates to a purge system for a vapor compression system including a dual emission canister system. The dual emission canister system includes a first emission canister coupled to a conduit system, where the conduit system includes an inlet configured to receive a gas flow including a mixture of refrigerant and non-condensable gases from the vapor compression system. The purge system includes a second emission canister coupled to the conduit system and a plurality of valves of the conduit system. The plurality of valves is configured to selectively direct the gas flow through the first emission canister or the second emission canister. In particular, the plurality of valves is configured to direct the gas flow to the first emission canister during a regeneration cycle of the second emission canister and direct the gas flow to the second emission canister during a regeneration cycle of the first emission canister.

The present disclosure also relates to a purge system for a vapor compression system including an emission canister system having a plurality of emission canisters. A conduit system fluidly couples each emission canister of the plurality of emission canisters to a flow of refrigerant and non-condensable gases from the vapor compression system. The purge system also includes a plurality of valves coupled to the conduit system, where the plurality of valves is configured to selectively direct the flow of refrigerant and non-condensable gases through the plurality of emission canisters. In particular, the plurality of valves is configured to direct the flow of refrigerant and non-condensable gases to a first emission canister of the plurality of emission canisters during a regeneration cycle of a second emission canister of the plurality of emission canister, such that the first emission canister undergoes a saturation cycle.

BRIEF DESCRIPTION OF THE DRAWINGS

Various aspects of this disclosure may be better understood upon reading the following detailed description and upon reference to the drawings in which.

DETAILED DESCRIPTION

Figure 1:
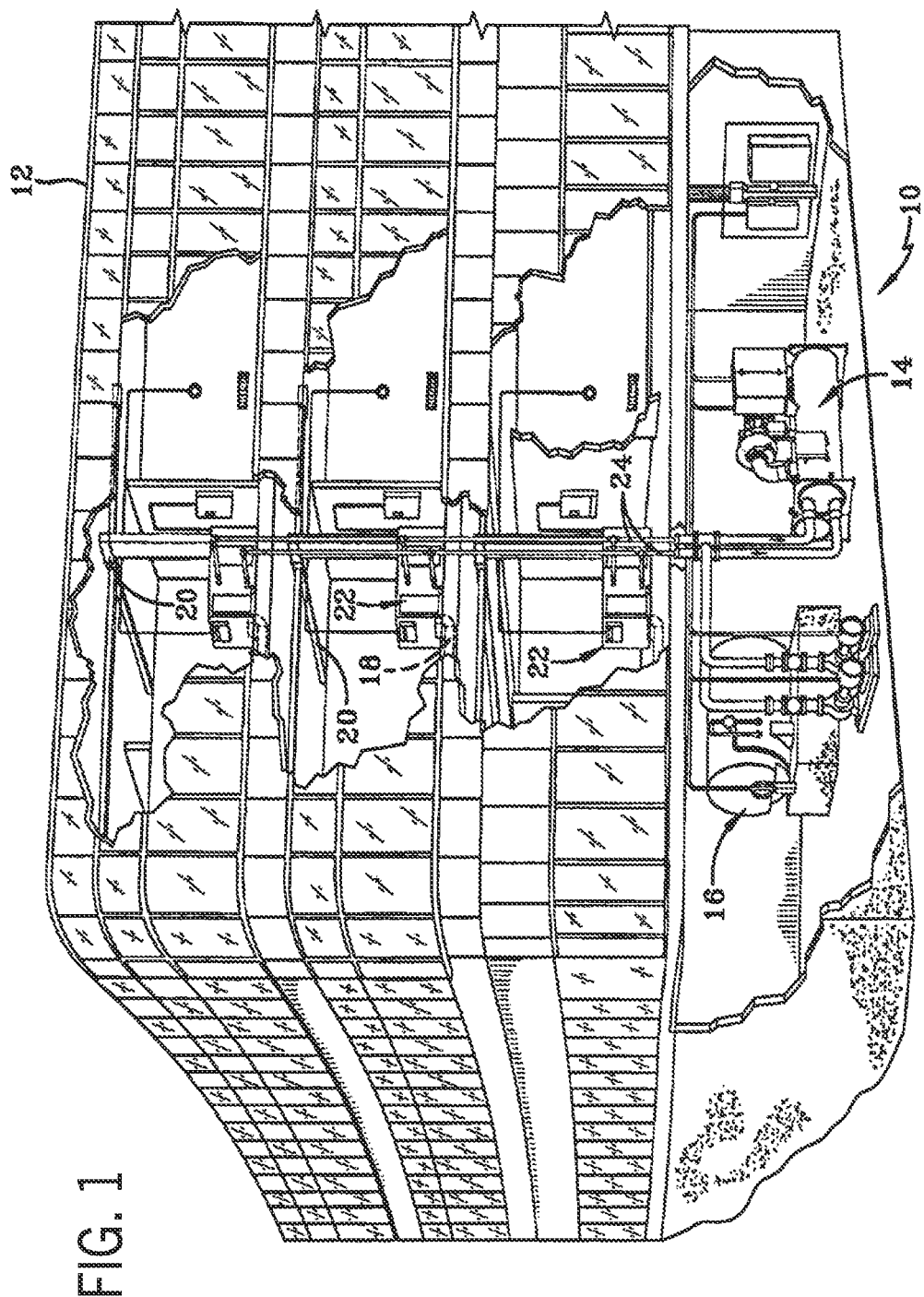
FIG. 1 is a perspective view of an embodiment of a building that may utilize a heating, ventilating, air conditioning, and refrigeration (HVAC&R) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A purge system including an emission canister system may be integrated with a vapor compression system and used to separate non-condensable gases that may mix with a refrigerant within the vapor compression system. The emission canister may include an adsorbent material that is configured to draw in and collect adsorbate (e.g., the refrigerant) within pores of the adsorbent, while the non-condensable gases may continue to flow through the emission canister and vent to an external environment (e.g., the atmosphere). Unfortunately, it may be difficult to determine when the adsorbent material within the emission canister has become saturated (e.g., is no longer capable of adsorbing the adsorbate). Typical emission canisters may use time as an indicator to determine when the emission canister is saturated and/or when to initiate a regeneration cycle that releases the adsorbate from within the adsorbent. Additionally, typical emission canisters may require a substantial cooldown time between the regeneration cycles before reaching operable temperatures for adsorption, which may cause the vapor compression system to temporarily shut down. In some embodiments, the purge system may bypass the emission canister during this cooldown time and reduce separation of the non-condensable gases from the refrigerant, which may lower an effectiveness of the purge system.

Embodiments of the present disclosure are directed to an emission canister system that may adsorb a larger quantity of adsorbate than typical emission canisters through the use of silica gel as the adsorbent material. That is, the emission canister may adsorb a larger amount of adsorbate per a particular volume of adsorbent as compared to conventional emission canisters. Further embodiments of the emission canister may include a system to determine the saturation point of the emission canister using a temperature of the adsorbent material and/or a weight of the adsorbent material. Furthermore, the purge system may include a dual emission canister system to enable the vapor compression system to operate continuously without shutting down when the emission canister undergoes the regeneration cycle. Dual heating elements may be disposed within the emission canister to heat the adsorbent evenly along a central axis of the emission canister, which may improve the efficiency of the regeneration cycle and/or prolong an operating life of the adsorbent. In some embodiments, a baffled divider may be coupled to the dual heating elements to facilitate more even heat distribution across the adsorbent. In addition, the baffled divider may define multiple flow paths through the adsorbent, thereby enhancing an exposure time between the adsorbent and the adsorbate flowing through the emission canister. Embodiments of the present disclosure also include an access cap that is removably coupled to the emission canister to enable inspection and/or replacement of the adsorbent. Further embodiments of the present disclosure include a cooling system that may be coupled to the emission canister to reduce a cool down time for the emission canister between regeneration cycles. Still further embodiments of the present disclosure include various plumbing configurations and control systems that may enhance an operational efficiency of the purge system and/or facilitate regeneration of the emission canister.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
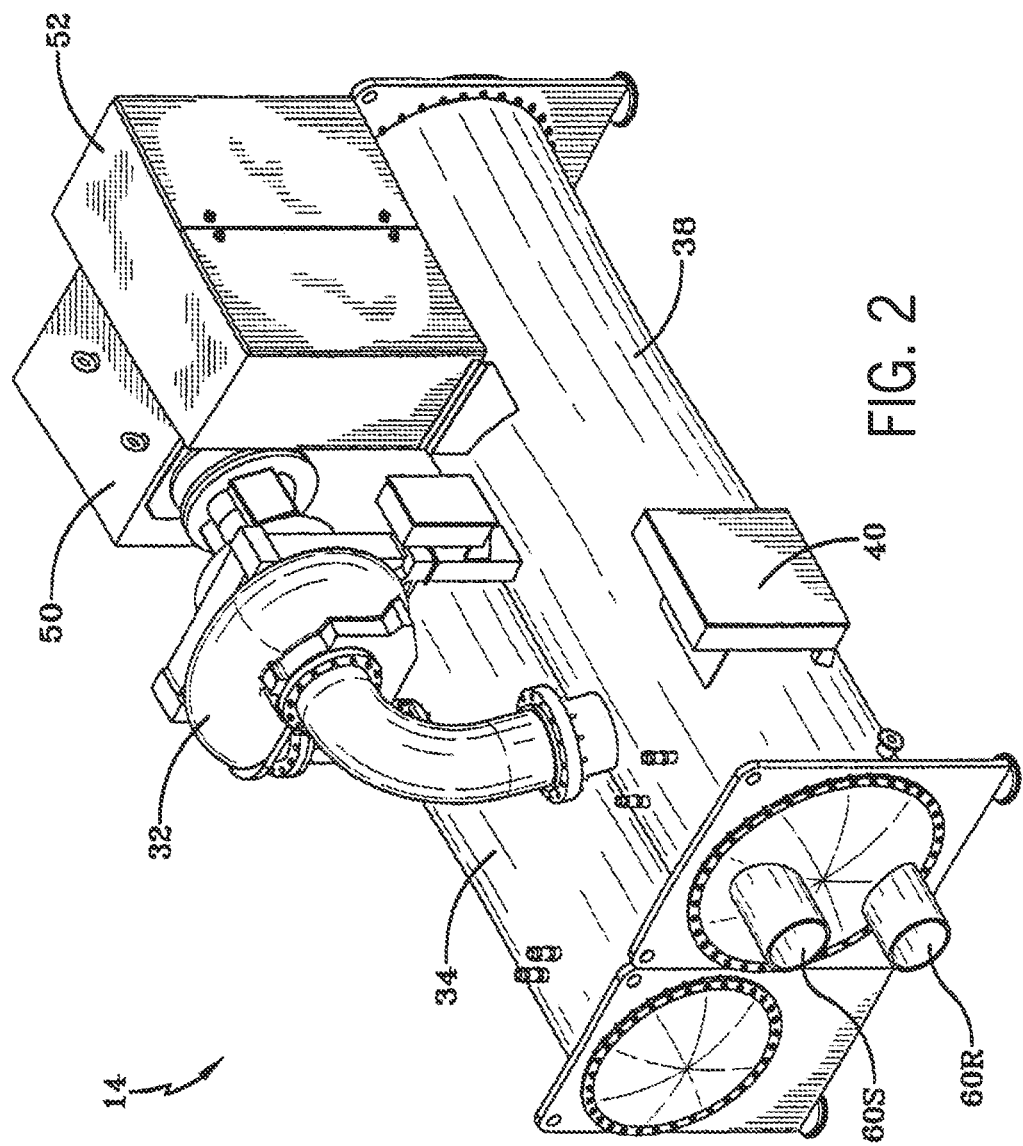
FIG. 2 is a perspective view of a vapor compression system, in accordance with an aspect of the present disclosure.
Figure 3:
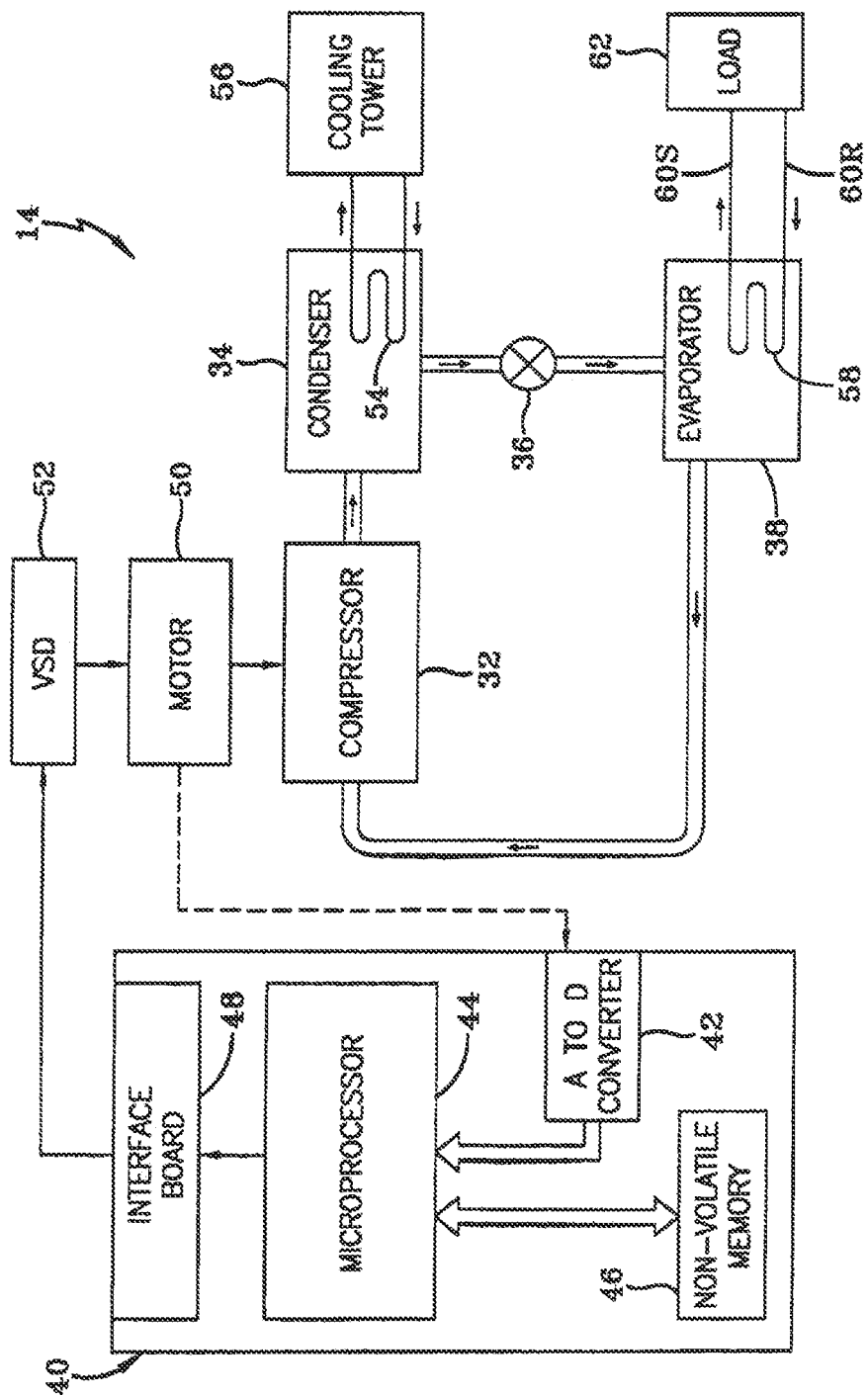
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser 34.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
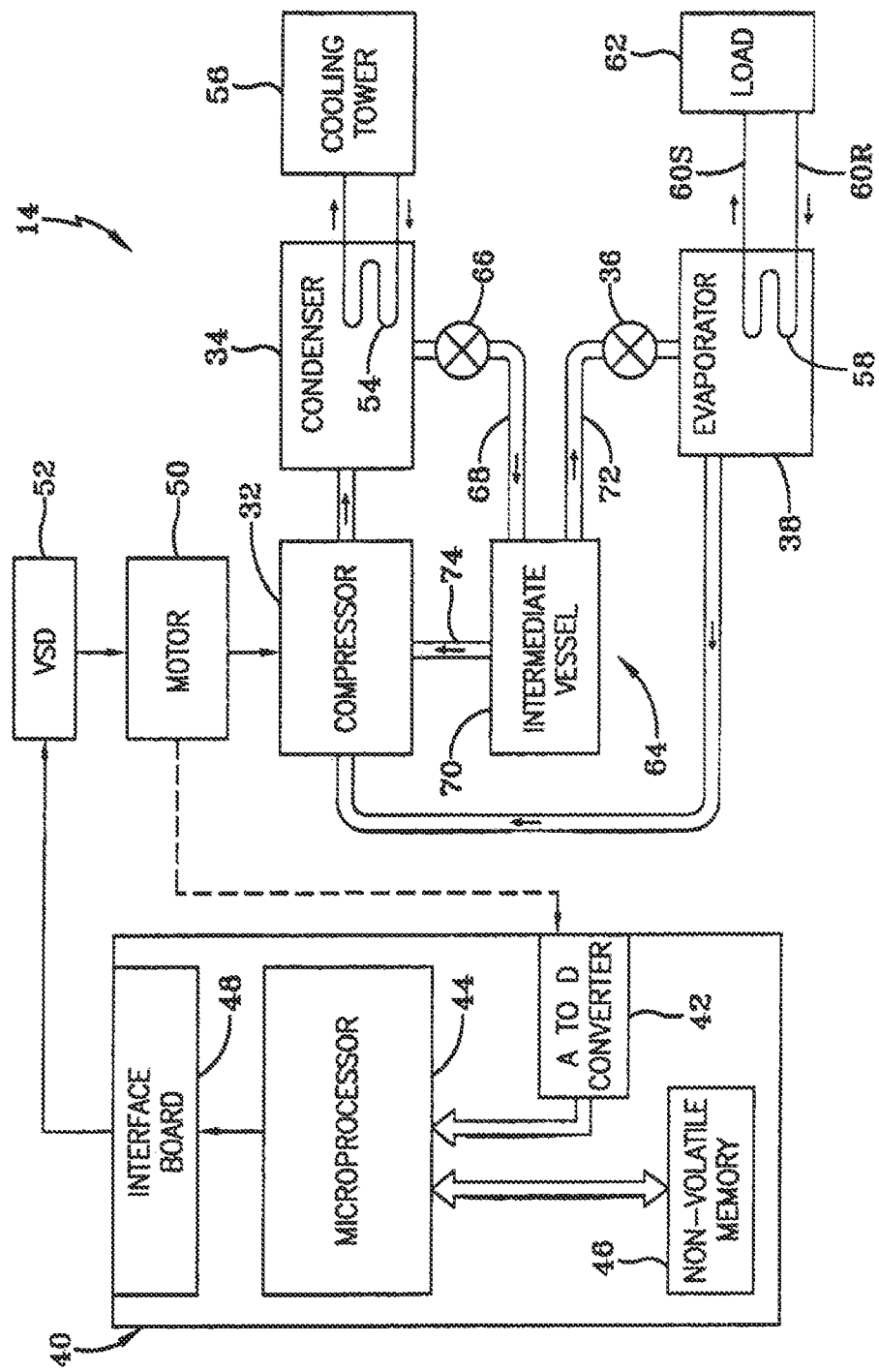
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

System for Improved Emission Canister Composing Silica Gel Adsorbent

Figure 5:
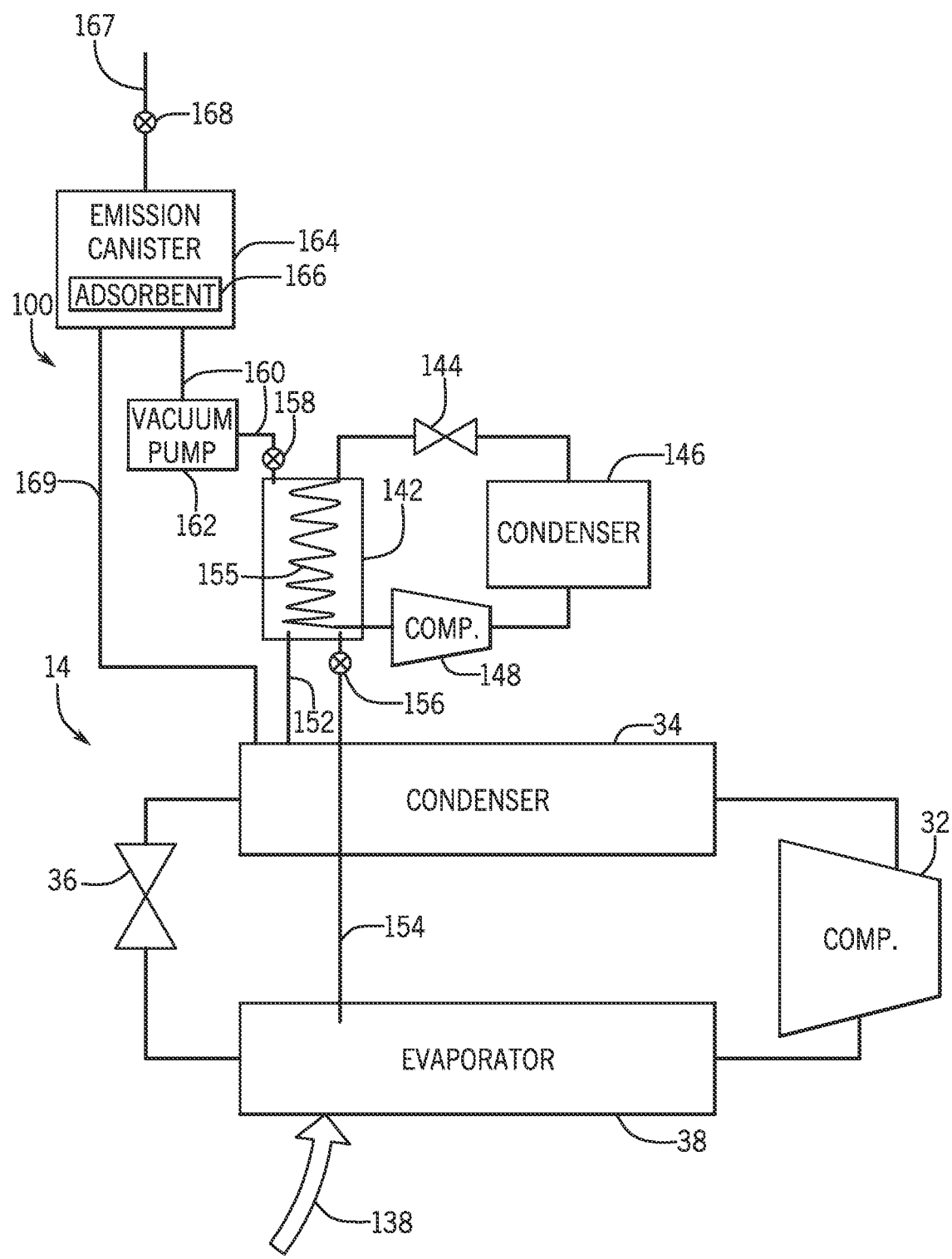
FIG. 5 is a schematic diagram of an embodiment of the vapor compression system having a purge system including an emission canister, in accordance with an embodiment of the present disclosure.

FIG. 5 is a schematic of the vapor compression system 14 with a purge system 100 incorporated between the condenser 34 and the evaporator 38. In some embodiments, refrigerant within a portion (e.g., the evaporator 38) of the vapor compression system 14 may operate at a lower pressure than an ambient pressure (e.g., less than 14.7 psi). As such, a pressure differential may be created between the refrigerant within the vapor compression system 14 and the ambient environment. In some embodiments, non-condensable gases 138 (e.g., air, nitrogen) from the ambient environment may penetrate portions (e.g., connections between the refrigeration circuit or other components) of the vapor compression system 14 and mix with the refrigerant. The non-condensable gases 138 may include any gases (e.g., air, nitrogen) that are not condensable at operating temperatures of the vapor compression system 14 (e.g., normal operating temperatures of the vapor compression system that are not achieved in a laboratory setting). The non-condensable gases 138 may be circulated through the vapor compression system 14 via the compressor 32 and accumulate in the condenser 34, which may ultimately reduce the efficiency of the vapor compression system 14, the compressor 32, the condenser 34, or any combination thereof. It should be recognized that in other embodiments, the vapor compression system 14 may include additional or fewer components than the embodiment illustrated in FIG. 5.

As shown in the illustrated embodiment of FIG. 5, the purge system 100 may be used to purge the non-condensable gases 138 from the vapor compression system 14. For example, the purge system 100 may be configured to remove and/or separate the non-condensable gases 138 from the refrigerant within the vapor compression system 14. The purge system 100 may include a heat exchanger 142 (e.g., an evaporator and/or a purge coil), an expansion valve 144, a condenser 146, and/or a compressor 148 that may be in fluid communication with one another. The compressor 148 may direct a purge refrigerant (e.g., a medium or high pressure refrigerant) through the purge system 100. A flow path of the purge refrigerant in the purge system 100 may be fluidly isolated from refrigerant of the vapor compression system 14. In some embodiments, the purge refrigerant may flow through the compressor 148, the condenser 146, the expansion valve 144, the heat exchanger 142, and re-enter the compressor 148. In another embodiment, the purge system 100 may contain additional or fewer components than the embodiment illustrated in FIG.

In any case, a gaseous mixture of refrigerant and non-condensable gases 138 may flow from the condenser 34 of the vapor compression system 14 to the heat exchanger 142 of the purge system 100 via an inlet tube 152. In some embodiments, the mixture of refrigerant and non-condensable gases 138 may flow into the heat exchanger 142 via a thermal siphon. Additionally or alternatively, a partial vacuum may be created within the heat exchanger 142 (e.g., when the incoming refrigerant condenses in the heat exchanger 142). A coil 155 may be disposed within the heat exchanger 142 and may be configured to flow the purge refrigerant, such that the purge refrigerant absorbs heat (e.g., thermal energy) from the mixture of refrigerant and non-condensable gases 138 within the emission canister 164. As such, the refrigerant may condense into the liquid state and the non-condensable gases 138 may remain in the gaseous state. The liquid refrigerant may be drained from the heat exchanger 142 of the purge system 100 to the evaporator 38 of the vapor compression system 14 via an outlet tube 154. A valve 156 may be coupled to the outlet tube 154 and control the flow of the refrigerant exiting the heat exchanger 142. It should be noted that in other embodiments, the outlet tube 154 may be coupled to the condenser 34 rather than the evaporator 38. Accordingly, liquid refrigerant may be drained from the heat exchanger 142 to the condenser 34.

In some cases, such as when a partial pressure of the refrigerant is low, a portion of the refrigerant within the heat exchanger 142 may not condense and thus remain in the gaseous state. A discharge valve 158 and a discharge conduit 160 may be coupled to a vacuum pump 162 that may be configured to remove the gaseous mixture of refrigerant and non-condensable gases 138 from the heat exchanger 142 of the purge system 100. The vacuum pump 162 may direct the mixture into an emission canister 164 that may be configured to further separate the gaseous state refrigerant from the non-condensable gases 138.

For example, an adsorbent 166 may be disposed within the emission canister 164 and configured to adsorb an adsorbate (e.g., the refrigerant). The adsorbent 166 may be a porous material (e.g., having a high specific surface area) that may have an electrochemical affinity with the adsorbate. As described in greater detail herein, the adsorbent 166 may be a silica gel. The adsorbate may be drawn into and collected in pores of the adsorbent 166, while the non-condensable gases 138 may continue to flow through the emission canister 164. As such, the emission canister 164 may be configured to separate substantially all of the refrigerant from the non-condensable gases 138 within the emission canister 164. The non-condensable gases 138 may then be released into the ambient environment via an exhaust valve 168 of an exhaust vent 167.

The adsorbent 166 of the emission canister 164 may become saturated when the adsorbate fills a majority of the pores of the adsorbent 166. In some embodiments, the emission canister 164 may be regenerated when the adsorbent 166 is saturated. For example, the flow of adsorbate into the emission canister 164 may be stopped and the emission canister 164 may be heated to undergo a regeneration cycle. The exhaust valve 168 may be closed during the regeneration cycle to prevent adsorbate from escaping into the ambient environment. In some embodiments, energy may be applied to the adsorbent 166 and the adsorbate (e.g., via a decrease in pressure, an increase in temperature, or both), such that the adsorbate may be released from the pores of the adsorbent 166. For example, one or more heating elements within the emission canister 164 may heat the adsorbent 166 and/or the adsorbate within the emission canister 164 to release the adsorbate from the adsorbent 166. The released adsorbate (e.g., the refrigerant) may be drained or directed from the emission canister 164 and flow back toward the vapor compression system 14 (e.g., due to a pressure differential between the emission canister 164 and the vapor compression system 14) via an outlet conduit 169. In some embodiments, an additional vacuum pump may be in fluid communication with the outlet conduit 169 and may be configured to direct the released adsorbate from the emission canister 164 toward the condenser 34. Although the outlet conduit 169 is shown as coupled to the condenser 34 in the illustrated embodiment of FIG. 5, it should be noted that in other embodiments, the outlet conduit 169 may be fluidly coupled to the evaporator 38, or any other suitable portion of the vapor compression system 14. Regardless, in some embodiments, multiple regeneration cycles may be used to release the adsorbate from the adsorbent 166. In other embodiments, the saturated emission canister 164 may be replaced with an unsaturated emission canister 164 in addition to, or in lieu of, the regeneration cycle.

As set forth above, in one embodiment, silica gel may be used as the adsorbent 166 instead of conventional materials, such as activated carbon or activated charcoal. The silica gel may include a higher material density than conventional adsorbent 166 materials and, as such, an increased mass of silica gel may be placed within a fixed volume (e.g., the emission canister 164) as compared to conventional adsorbent 166 materials. As a non-limiting example, the material density of the silica gel may be 10 pounds per cubic foot (1 $lb/ft^3$)-150 $lb/ft^3$, 20 $lb/ft^3$-100 $lb/ft^3$, or 30 $lb/ft^3$-50 $lb/ft^3$. As such, using silica gel as the adsorbent 166 in the emission canister 164 may enable the adsorbent 166 to have a higher specific surface area (e.g., the available surface area per unit of mass of adsorbent 166) in a fixed volume comparison than conventional materials. The higher specific surface area may enable the silica gel to adsorb substantially more adsorbate (e.g., the refrigerant) than conventional adsorbent materials, and may improve the efficiency of the emission canister 164. For example, the silica gel may enable the emission canister 164 to operate for longer periods of time before being required to undergo the regeneration cycle.

System and Method for Determining Emission Canister Saturation Point Using Temperature In some embodiments, it may be useful to determine when to undergo the regeneration cycle. For example, it may be desirable to determine when the adsorbent 166 (e.g., the silica gel) within the emission canister 164 has been saturated with adsorbate (e.g., the refrigerant). Typical systems having emission canisters may use time as an indicator in determining remaining adsorption capacity of the adsorbate. For example, a second regeneration cycle may be initiated after a set amount of time has elapsed from a first regeneration cycle. Unfortunately, time may not be an accurate indication of saturation, such that using a different indicator such as temperature to determine when the adsorbent 166 has reached a saturation point may increase an efficiency of the emission canister 164.

Figure 6:
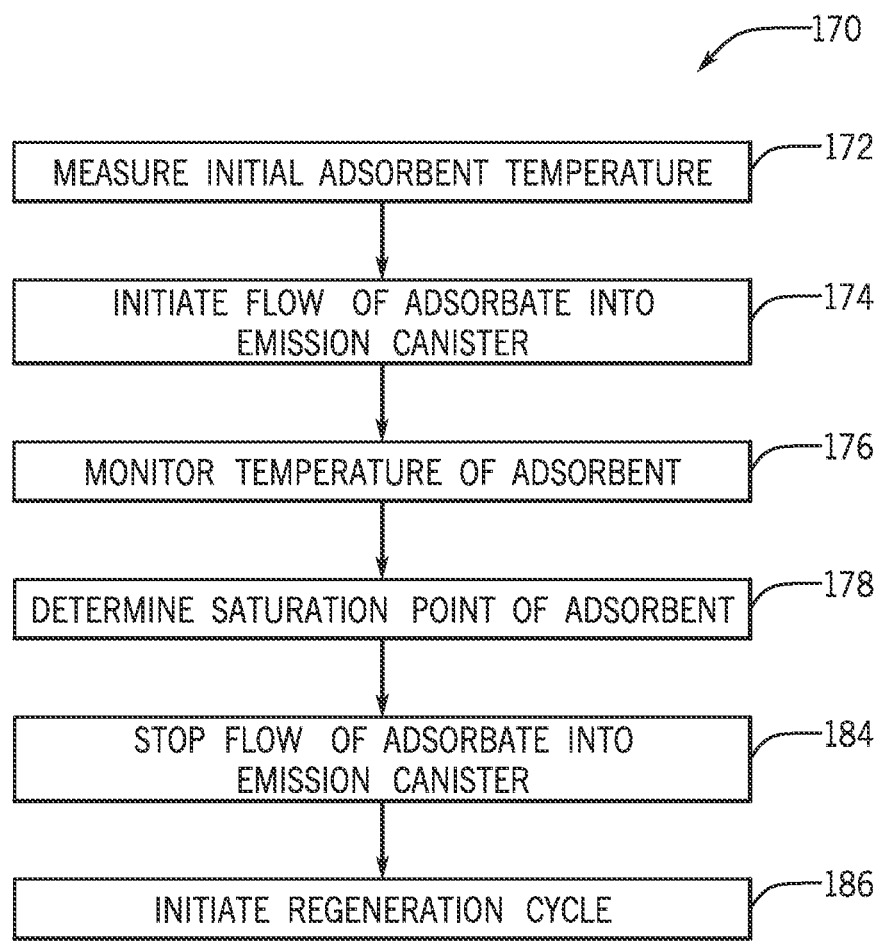
FIG. 6 is a flow chart of an embodiment of a method for determining a saturation point of an adsorbent disposed within the emission canister, in accordance with an embodiment of the present disclosure.

For example, FIG. 6 is a block diagram of an embodiment of a method 170 that may be used to determine the saturation point of the adsorbent 166, and thus, when to initiate the regeneration cycle using temperature as the indicator of saturation. At block 172, an initial temperature of the adsorbent 166 may be measured. In some embodiments, one or more thermocouples may be coupled to the emission canister 164 and configured to measure the temperature of the adsorbent 166 and/or the overall temperature of the emission canister 164. In other embodiments, the temperature of the adsorbent may be measured using other suitable temperature sensors, such as an infra-red (IR) sensor. The temperature of the adsorbent 166 may be measured continuously or intermittently (e.g., after lapse of a predetermined time interval). At block 174, a flow of adsorbate into the emission canister 164 may be initiated, such that the adsorbate (e.g., the refrigerant) flowing into the emission canister 164 may adhere to and/or be adsorbed by the adsorbent 166 (e.g., the silica gel).

Figure 7:
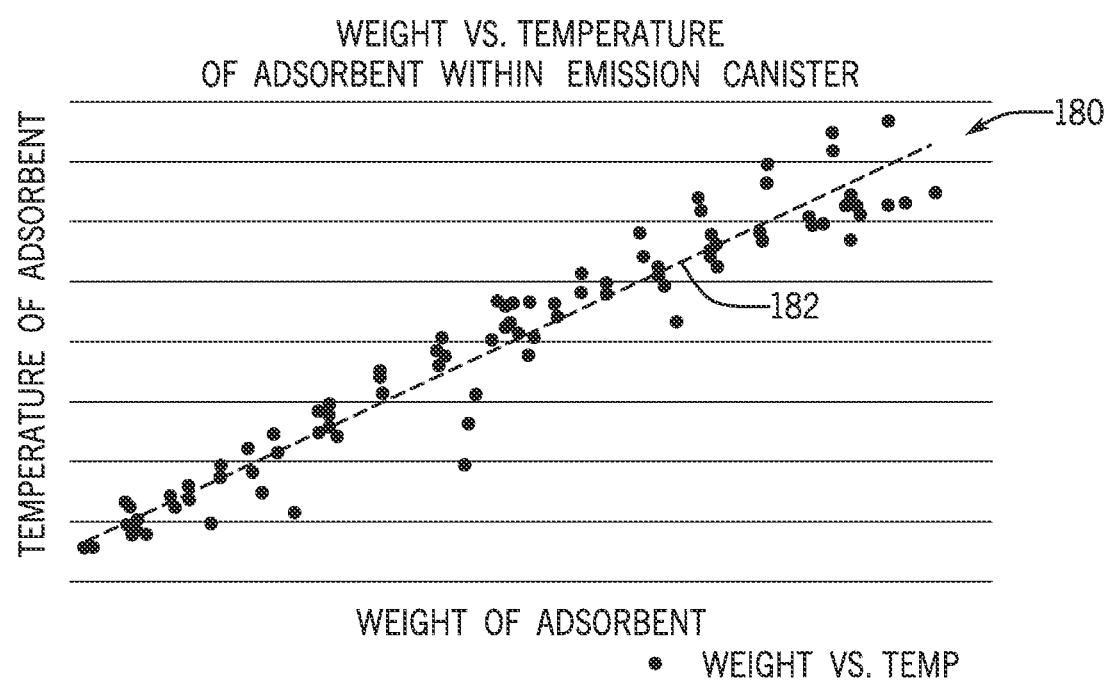
FIG. 7 is a graph illustrating a relationship between temperature and weight of the adsorbent used to determine the saturation point set forth in the method of FIG. 6, in accordance with an embodiment of the present disclosure.

Blocks 176 and 178 relate to FIG. 7, which includes an embodiment of a graph 180 used to compare a weight of the adsorbent 166 to a temperature of the adsorbent 166, as the adsorbent 166 within the emission canister 164 adsorbs the adsorbate. The weight of the adsorbent 166 may increase over time as the adsorbent 166 adsorbs the adsorbate. Additionally, a temperature of the emission canister 164 may also increase as the adsorbent 166 adsorbs the adsorbate. As such, the weight of the adsorbent 166 and the temperature of the adsorbent 166 may include a linear correlation, as shown by line 182 of FIG. 7. In other embodiments, the weight of the adsorbent 166 and the temperature of the adsorbent 166 may include an exponential, logarithmic, or other suitable correlation to one another. In any case, measuring the temperature of the adsorbent 166 may enable the saturation point of the adsorbent 166 to be estimated, and thus, the regeneration cycle may be initiated when the saturation point is determined based on the temperature of the emission canister 164.

For example, laboratory tests may be conducted using weight scales and thermocouples to measure temperature and weight of the adsorbent 166 (e.g., such as shown in the graph 180 of FIG. 7). The measurements may be used to determine a correlation (e.g., line 182) between the temperature of the adsorbent 166 (e.g., the silica gel) and the weight or quantity of adsorbate (e.g., the refrigerant) that has been adsorbed in the adsorbent 166. As such, the saturation point of the adsorbent 166 may be determined through experimental data. Accordingly, the correlation may determine that a specified first quantity of adsorbent 166 reaches the saturation point (e.g., cannot intake more adsorbate) after adsorbing a first quantity of adsorbate and reaching a specific temperature. As such, a graph, such as the graph 180 of FIG. 7, may be used to determine when the adsorbent 166 has reached the saturation point.

The specific temperature value may be used to determine when the adsorbent 166 within the emission canister 164 has reached the saturation point. That is, the adsorbent 166 may become saturated when a measured temperature of the adsorbent 166 meets or exceeds a target temperature indicative of the adsorbent 166 being saturated. The target temperature may be determined using experimental trials. As a non-limiting example, the experimental data described previously may determine that the first quantity of adsorbent 166 may reach 100 degrees Fahrenheit at the saturation point. In this example, when the emission canister 164 having the first quantity of adsorbent 166 reaches 100 degrees Fahrenheit, or exceeds 100 degrees Fahrenheit, an operator (e.g., human operator, computer system) may determine that the saturation point has been reached.

Returning now to blocks 184 and 186 of FIG. 6, the flow of adsorbate into the emission canister 164 from the purge system 100 may be blocked when the adsorbent 166 has reached the saturation point. The regeneration cycle may be initiated to remove the adsorbate from the adsorbent 166. In some embodiments, the adsorbate released during the regeneration cycle (e.g., the refrigerant) may be directed back into the vapor compression system 14. In some embodiments, the method 170 may additionally be used to determine when the regeneration cycle has been completed. For example, the method 170 may be used to determine when a sufficient amount of the adsorbed adsorbate within the adsorbent 166 has been released from the adsorbent 166. When the emission canister 164 reaches a threshold temperature indicative of substantially no adsorbate in the adsorbent 166, the regeneration cycle may be complete (e.g., the regeneration cycle may be terminated). This threshold temperature may be determined through experimental data derived using the techniques discussed above. As such, the method 170 may be used to optimize the regeneration cycle and decrease the power consumption required to run the regeneration cycles and/or prolong the life of the adsorbent 166.

System for Determining Emission Canister Saturation Point Using Weight

Figure 8:
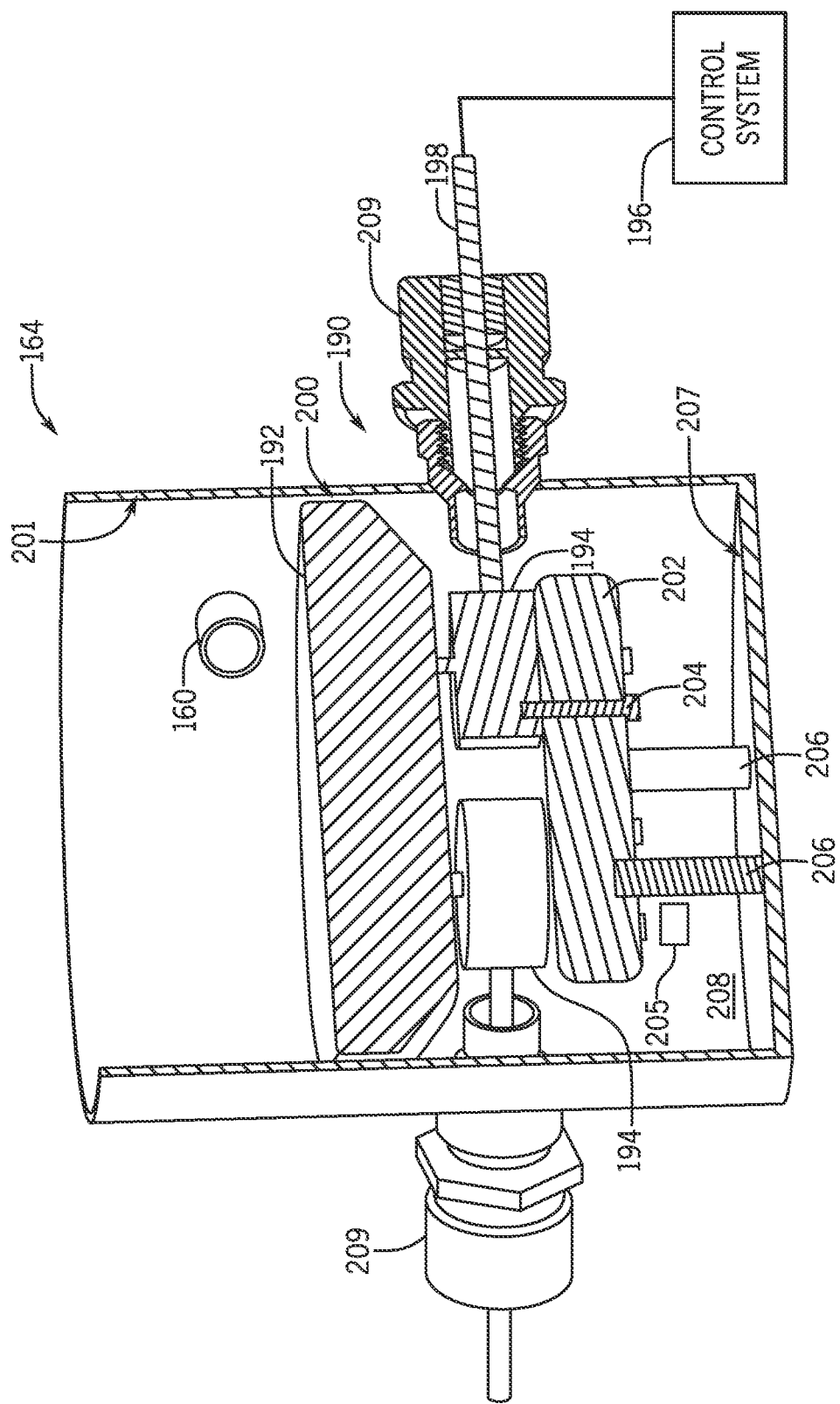
FIG. 8 is a cross-sectional perspective view of an embodiment of a scale system configured to monitor a weight of an adsorbent material collected within the emission canister, in accordance with an embodiment of the present disclosure.

FIG. 8 is a cross section of an embodiment of a scale system 190 that may also be used to determine the saturation point of the adsorbent 166 disposed within the emission canister 164 in addition to, or in lieu of, the method 170 of FIG. 6. In some embodiments, a flow of adsorbate (e.g., the refrigerant) may enter the emission canister 164 through the discharge conduit 160 (as shown in FIG. 5). As set forth above, the adsorbent 166 may adsorb the adsorbate during purging of the vapor compression system 14 and increase in weight as more of the adsorbate is adsorbed. In some embodiments, the adsorbent 166 may be disposed upon a base 192 coupled to one or more load cells 194. In certain embodiments, the load cells 194 are disposed evenly (e.g., symmetrically) about a central axis of the emission canister 164. The load cells 194 may monitor a weight of the adsorbent 166 and send data regarding the weight to a control system 196. As described in greater detail herein, the control system 196 may initiate and/or terminate the regeneration cycle based on feedback received from the load cells 194 and/or other suitable sensors (e.g., thermocouples).

In one embodiment, the base 192 may include a thermally insulating material that may isolate the load cells 194 from temperature fluctuations that the adsorbent 166 may experience during saturation and/or regeneration cycles. A gap 200 between the base 192 and an interior surface 201 (e.g., a circumferential wall) of the emission canister 164 may reduce friction between the base 192 and the interior surface 201. For example, the gap 200 may reduce noise that may be detected by the load cells 194 (e.g., abnormalities in the weight data measured by the load cells 194) due to friction between the base 192 and the interior surface 201. The load cells 194 may be supported by a platform 202, and may be coupled to the platform 202 via fasteners 204 (e.g., bolts, screws, adhesives, or other suitable coupling devices). The platform 202 may be supported by supports 206 coupled to a bottom surface 207 of the emission canister 164. The supports 206 may form a space 108 between the surface 207 and the platform 202. In some embodiments, the space 208 may be occupied by a thermally insulating mesh 205 that may further insulate the load cells 194 from thermal fluctuations in the emission canister 164. In some embodiments, the refrigerant may cause the load cells 194 to incur wear. As such, the thermally insulating mesh 205 may additionally isolate the load cells 194 from contact with the refrigerant.

As shown in the illustrated embodiment of FIG. 8, sealed fittings 209 may be coupled to the emission canister 164. The sealed fittings 209 may enable wires 198 coupled to the load cells 194 to enter the emission canister 164 while blocking adsorbate from leaking out of the emission canister 164. The control system 196 may receive and analyze data from the load cells 194 to determine the weight of the adsorbent 166 and adsorbate disposed above the base 192. In some embodiments, experimental data may be used to determine certain physical and/or chemical properties of the adsorbent 166 (e.g., the silica gel). For example, the experimental weight data may include a threshold weight of the adsorbent 166 indicative of when the adsorbent 166 is saturated with adsorbent (e.g., the refrigerant). As such, the scale system 190 may be used to determine when a specified quantity of adsorbent 166 within the emission canister 164 has become saturated with adsorbate.

System for Purging Vapor Compression System Using Dual Emission Canisters

Figure 9:
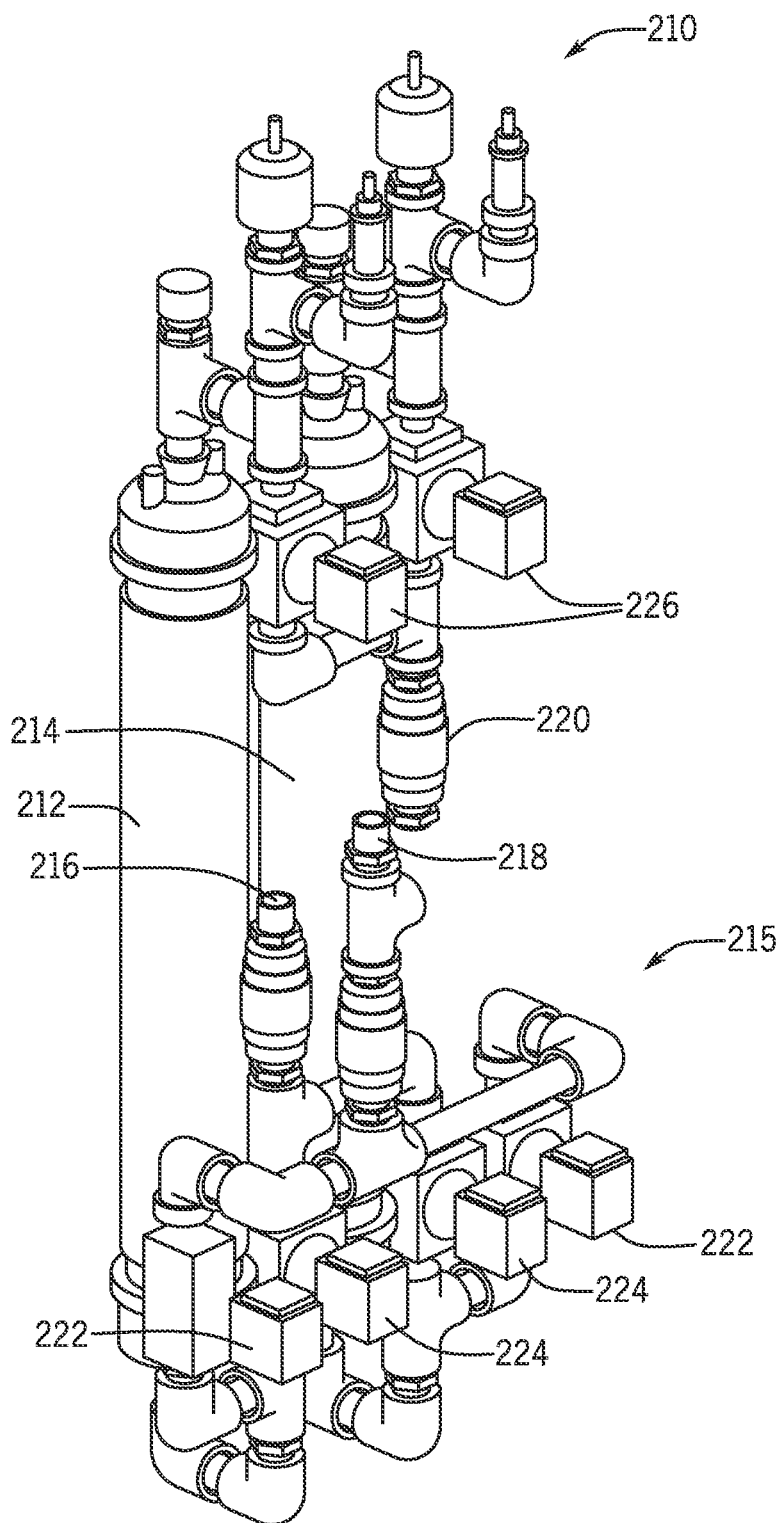
FIG. 9 is a perspective view an embodiment of a dual emission canister system that may be included in the purge system, in accordance with an embodiment of the present disclosure.

FIG. 9 is a perspective view of an embodiment of a dual emission canister system 210 that may be used in addition to, or in lieu of, the emission canister 164 of the purge system 100 set forth above. In some embodiments, it may be desirable to purge (e.g., remove and/or separate the non-condensable gases 138 from the refrigerant) the vapor compression system 14 while the emission canister 164 is undergoing the regeneration cycle. The purge system 100 may bypass the emission canister 164 while the emission canister 164 is undergoing the regeneration cycle, thus reducing separation of the non-condensable gases 138 and the refrigerant. In other words, the effectiveness of the purge system 100 may decrease.

In some embodiments, the vapor compression system 14 may be temporarily shut down as the regeneration cycle of the emission canister 164 is performed. As such, the vapor compression system 14 may not be able to provide cooling capacity during the regeneration cycle. Accordingly, the dual emission canister system 210 may increase an amount of separation between the refrigerant and the non-condensable gases 138 and/or avoid temporarily shutting down of the vapor compression system 14 by using multiple emission canisters. For example, a first emission canister 212 may absorb adsorbate while a second emission canister 214 undergoes the regeneration cycle. As such, the dual emission canister system 210 may enable one emission canister 212 and/or 214 to purge the vapor compression system 14 such that the vapor compression system 14 may be run continuously.

In some embodiments, the dual emission canister system 210 may be included in the purge system 100 of FIG. 5 instead of the single emission canister 164. To facilitate retrofitting the dual emission canister system 210 into the purge system 100, the dual emission canister system 210 may include a single inlet 216, a single outlet 218, and a single vent 220, which may couple to existing piping of the purge system 100, which receives the discharge conduit 160, outlet conduit 169, and the exhaust vent 167 respectively. Connections of the dual emission canister 210 may also facilitate assembly of the purge system 100 and/or reduce an overall cost of the purge system 100 when compared to existing systems having more than one emission canister. Further, the configuration of the dual emission canister system 210 may facilitate coupling the dual emission canister system 210 having two emission canisters 212, 214 to a system previously configured to include the single emission canister 164. As discussed below, although two emission canisters 212, 214 are shown in the illustrated embodiment of FIG. 9, the dual emission canister system 210 may be configured to include 3, 4, 5, 6, or more than 6 emission canisters.

A flow path of the gaseous mixture of refrigerant and non-condensable gases 138 may be controlled by valves of a piping system 215 of the dual emission canister system 210. The piping system 215 may direct the flow path of the gaseous mixture from the inlet 216 to the outlet 218 and/or to the vent 220. In some embodiments, each of the emission canisters 212, 214 may include an inlet valve 222, an outlet valve 224, and/or a vent valve 226 coupled to the inlet 216, the outlet 218, and the vent 220, respectively.

The inlet 216 may receive the gaseous mixture of refrigerant and non-condensable gases 138 from the heat exchanger 142 of the purge system 100. The valves of the piping system 215 may direct the gaseous mixture through the piping system 215, such that the first emission canister 212 may adsorb the adsorbate while the second emission canisters 214 undergoes the regeneration cycle, or vice versa. For example, valves 222, 224, 226 may be positioned to block the gaseous mixture from flowing towards the first emission canister 212 to enable the first emission canister 212 to undergo the regeneration cycle, while the second emission canister 214 receives the gaseous mixture from the heat exchanger 142 of the purge system 100 and adsorbs adsorbate (e.g., the refrigerant). During the regeneration cycle of the first emission canister 212, the valves 222, 224, 226 may be positioned such that the adsorbate may be directed back into the vapor compression system 14. As such, once the second emission canister 214 is saturated, the valves may be repositioned such that the first emission canister 212 now receives the adsorbate while the second emission canister 214 undergoes the regeneration cycle.

As noted above, in some embodiments, the dual emission canister system 210 may include more than two emission canisters. As a non-limiting example, the dual emission canister system 210 may include a quadruple emission canister system having four individual emissions canisters. In some embodiments, the four emission canisters may be configured to sequentially operate in a saturation cycle, a regeneration cycle, a cooldown cycle, and a resting or standby cycle. As used herein, the cooldown cycle refers to a time period after completion of the regeneration cycle, during which the emission canister 164 may cool from an elevated regeneration temperature to an ambient temperature or to a target temperature that is less than the elevated regeneration temperature. The resting or standby cycle refers to a time period after the emission canister 164 has cooled to the ambient temperature or to the target temperature that is less than the elevated regeneration temperature (e.g., a time period after completion of the cooldown cycle) during which the emission canister 164 does not receive adsorbate and the non-condensable gases. In other words, the emission canister 164 is substantially idle or inactive during the resting or standby cycle. After the resting or standby cycle, the emission canister 164 may then undergo the saturation cycle and receive a new flow of the adsorbate and the non-condensable gases 138.

In the foregoing example of the quadruple emission canister system, a first emission canister may undergo the saturation cycle, while a second emission canister may undergo the regeneration cycle, a third emission canister may undergo the cooldown cycle, and a fourth emission canister may undergo the resting or standby cycle. Upon saturation of the first emission canister, a gas flow of adsorbate and non-condensable gases 138 from the heat exchanger 142 may be directed toward the fourth emission canister (e.g., previously undergoing the resting or standby cycle), while gas flow to the first emission canister is suspended. Accordingly, the first emission canister may initiate the regeneration cycle, while the second, the third, and the fourth emission canisters undergo the cooldown cycle, the resting or standby cycle, and the saturation cycle, respectively. Operating the emission canisters in the aforementioned sequence may ensure that a time interval between saturation cycles of a particular emission canister is increased, thereby enabling the emission canisters to sufficiently cool to the ambient temperature or the target temperature between successive saturation cycles. Accordingly, the quadruple emission canister system may enhance an ability of a particular emission canister to adsorb adsorbate in a subsequent regeneration cycle.

System for Improved Heating During Regeneration Cycle of Emission Canister

In existing systems, the emission canister 164 may include heating elements disposed within a center of the emission canister 164 (e.g., along a central axis of the emission canister 164). The heating elements may extend through the adsorbent 166 within the emission canister 164 and supply energy (e.g., heat) to the adsorbent 166. The supplied energy may be used to release the adsorbate embedded within the pores of the adsorbent 166 during the regeneration cycle. In one embodiment, the adsorbent 166 may be a naturally insulating material and resist the conductive transfer of heat. As such, a significant quantity of heat must be supplied by the heating element to sufficiently heat portions of the adsorbate disposed furthest from the heating element. This heat may cause the adsorbent 166 nearest to the heating element to overheat, while the portions of the adsorbent 166 furthest from the heating element may not experience an increase in temperature sufficient to regenerate properly. This may result in inefficient regeneration cycles and/or premature deterioration of the adsorbent 166.

Figure 10:
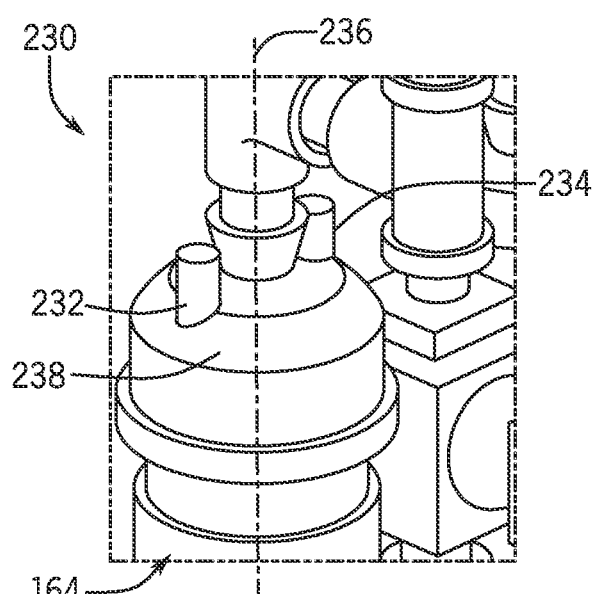
FIG. 10 is a perspective view of an embodiment of multiple heating elements extending through a cap plate of the emission canister, in accordance with an embodiment of the present disclosure.
Figure 11:
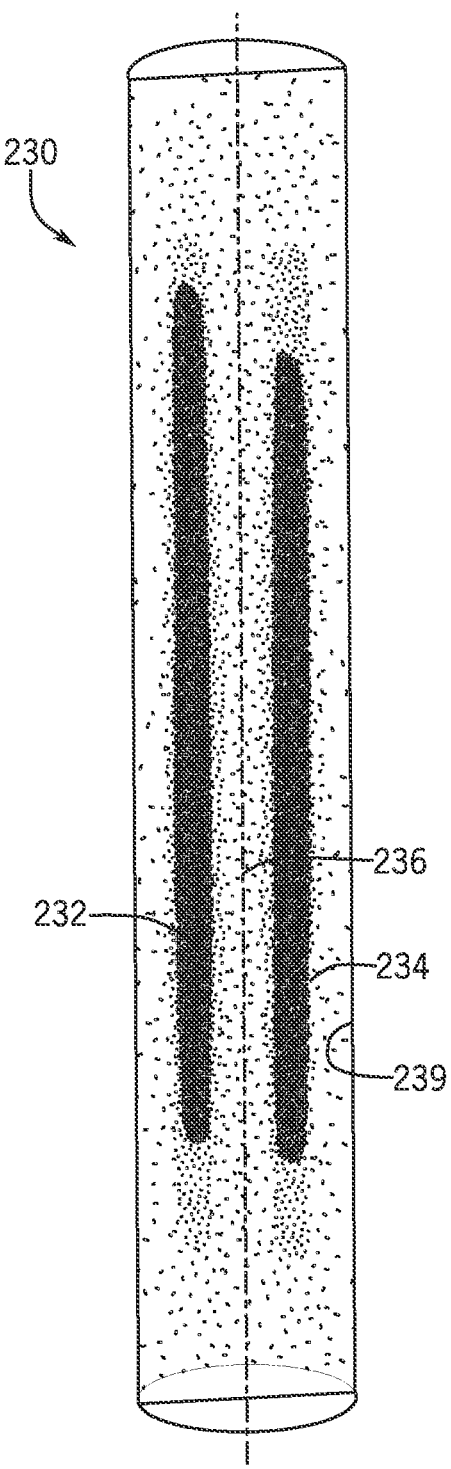
FIG. 11 is a heat distribution diagram of the emission canister of FIG. 10, in accordance with an embodiment of the present disclosure.

Accordingly, in some embodiments of the present disclosure, a dual heating element 230 may be used to generate even temperature distributions within the adsorbent 166 during the regeneration cycles (e.g., thermal regeneration cycles), as shown in FIGS. 10 and 11. For example, the dual heating element 230 may generate a more balanced temperature distribution throughout the adsorbent 166 as compared to existing systems including heating elements disposed within the center of the emission canister 164. FIG. 10 illustrates an embodiment of the emission canister 164 that may include a first heating element 232 and a second heating element 234, collectively referred to herein as dual heating elements 232, 234, which may be spaced evenly about a central axis 236 of the emission canister 164. That is, the dual heating elements 232, 234 may be disposed approximately equidistant from the central axis 236 of the emission canister 164. Portions of the dual heating elements 232, 234 may extend through a cap 238 of the emission canister 164 to receive electric power for heating the adsorbent 166 from one or more power sources. Although two heating elements are shown in the illustrated embodiment of FIG. 10, it should be noted that the emission canister 164 may include any suitable quantity of heating elements spaced about (e.g., circumferentially about) the central axis 236. For example, the emission canister 164 may include 2, 3, 4, 5, 6, or more than 6 heating elements disposed about the central axis 236.

FIG. 11 illustrates an embodiment of a heat distribution map that shows the thermal distribution caused by the first heating element 232 and second heating element 234. As shown in the illustrated embodiment of FIG. 11, the dual heating elements 232, 234 may evenly distribute heat about the central axis 236, which may enable substantially all of the adsorbent 166 to undergo regeneration without overheating portions of the adsorbent 166 positioned closer to the heating elements 232, 234. In addition, a larger portion of the adsorbent 166 may be heated sufficiently to undergo regeneration when compared to a single heating element disposed about the central axis 236.

For example, instead of supplying heat near the central axis 236, such as in a conventional emission canister 164 using a single heating element, the dual heating elements 232, 234 may supply the heat closer to an inner surface 239 of the emission canister 164. As such, the supplied heat energy travels a shorter distance from the heat source (e.g., the first heating element 232, the second heating element 234) to the adsorbent 166 and/or from the heat source to the interior surface 239 of the emission canister 164. As such, the dual heating elements 232, 234 may heat a larger portion of the adsorbent 166 to a regeneration temperature when compared to the single heating element, while utilizing substantially the same amount of electrical power to heat the adsorbent 166. Additionally, the dual heating elements 232, 234 do not overheat the adsorbent 166, thereby enhancing an operating life of the adsorbent 166.

In addition, the dual heating elements 232, 234 may enable heat to transfer to the adsorbent 166 more quickly when compared to conventional systems (e.g., the single heating element disposed coincident to the central axis 236). As discussed above, the dual heating elements 232, 234 decrease a distance through which heat may transfer in the emission canister 164 to heat substantially all of the adsorbent 166. As such, the dual heating elements 232, 234 may provide more efficient and faster regeneration cycles of the adsorbent 166 when compared to existing systems.

Figure 12:
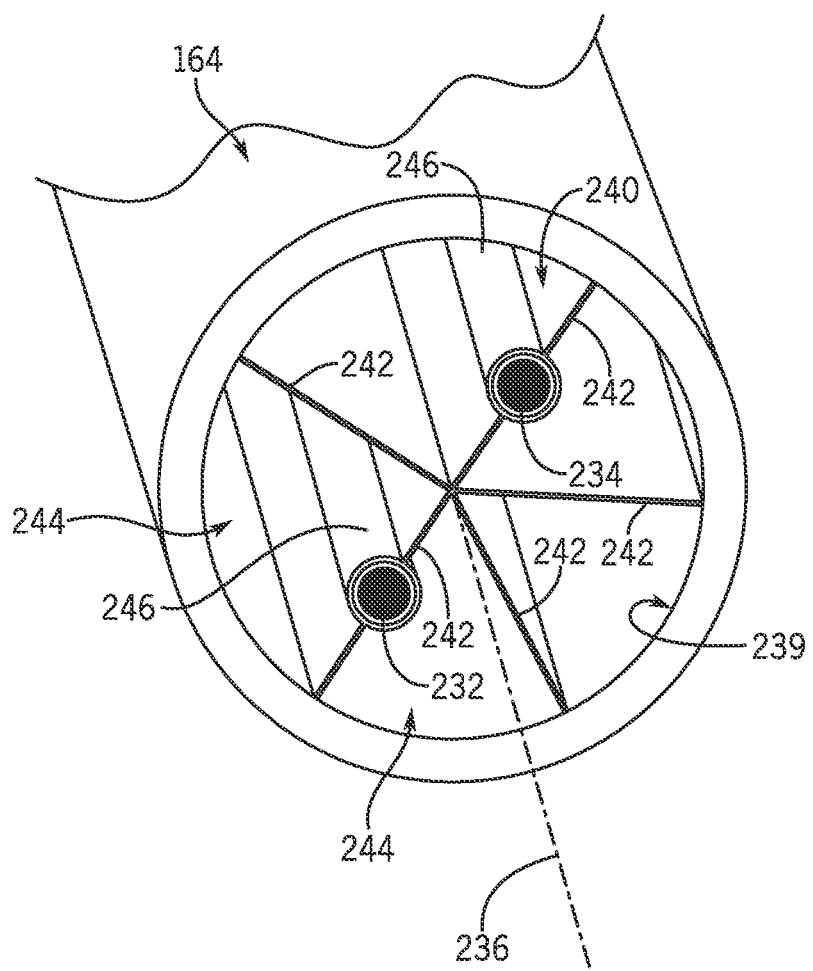
FIG. 12 is a perspective view of an embodiment of a baffled divider disposed within the emission canister, in accordance with an embodiment of the present disclosure.

FIG. 12 is a perspective view of an embodiment of a baffled divider 240 that may be coupled to the dual heating elements 232, 234 and facilitate heat transfer between the dual heating elements 232, 234 and the adsorbent 166. The baffled divider 240 may extend along a length, or a portion of the length, of the emission canister 164. The baffled divider 240 includes one or more fins 242 that extend radially from the central axis 236 of the emission canister 164. In certain embodiments, the fins 242 may abut or contact the interior surface 239 of the emission canister 164, thereby dividing an interior of the emission canister 164 into a plurality of chambers 244. Accordingly, each chamber 244 may house a portion of the adsorbent 166. However, in other embodiments, a radial gap may extend between the fins 242 and the interior surface 239 of the emission canister 164. Accordingly, a gasket may be disposed between radial edges of the fins 242 and the interior surface 239 of the emission canister 164 to block a flow of adsorbate and/or non-condensable gases between the chambers 244 via the gap.

In any case, the baffled divider 240 may include a pair of channels 246, where each channel 246 is configured to receive one of the first heating element 232 and the second heating element 234. In some embodiments, each of the channels 246 may be integrally formed within a respective fin 242 of the baffled divider 240. An inner diameter of the channels 246 may be substantially equal to an outer diameter of a respective heating element of the dual heating element 232, 234. Accordingly, the dual heating element 232, 234 may physically contact the baffled divider 240 when disposed within the channels 246, thereby enabling conductive heat transfer between the dual heating elements 232, 234 and the baffled divider 240. In certain embodiments, a thermally conductive gel or paste may be disposed within any interstitial spaces that may be formed between the dual heating elements 232, 234 and the channels 246, and thus, facilitate heat transfer therebetween.

The baffled divider 240 may be constructed of any suitable thermally conductive material, such as aluminum, copper, stainless steel, etc. Accordingly, thermal energy generated by the dual heating elements 232, 234 may be distributed throughout the fins 242 of the baffled divider 240 via conduction. Additionally, thermal energy distributed to the fins 242 of the baffled divider 240 may transfer to adsorbent 166 in the chambers 244 via conductive heat transfer or via convective heat transfer. In this manner, the fins 242 may further facilitate even distribution of thermal energy across the adsorbent 166. As noted above, evenly distributing thermal energy to the adsorbent 166 may mitigate or substantially reduce a likelihood of overheating certain portions of the adsorbent 166, and thus, enhance an operational life of the adsorbent 166. In addition, the baffled divider 240 may reduce a time period involved in heating substantially all of the adsorbent 166 to a sufficient temperature during regeneration.

Although the baffled divider 240 includes five fins 242 in the illustrated embodiment of FIG. 12, it should be noted that the baffled divider 240 may include any other suitable quantity of fins 242. That is, the baffled divider 240 may include 1, 2, 3, 4, 5, 6, 7, 8, or more than 8 fins 242 extending from the central axis 236 of the emission canister 164 or arranged in any other suitable configuration. In addition, the baffled divider 240 may include any suitable quantity of channels 246 configured to receive any number of heating elements. For example, the baffled divider 240 may include 1, 2, 3, 4, 5, or more than 5 channels 246 configured to receive 1, 2, 3, 4, 5, or more than 5 heating elements, respectively. Moreover, in certain embodiments, a single fin 242 of the baffled divider 240 may include more than one channel 246. That is, a single fin 242 may include two or more channels 246 configured to receive respective heating elements of the emission canister 164.

System for Improved Adsorbate Exposure within Emission Canister

Figure 13:
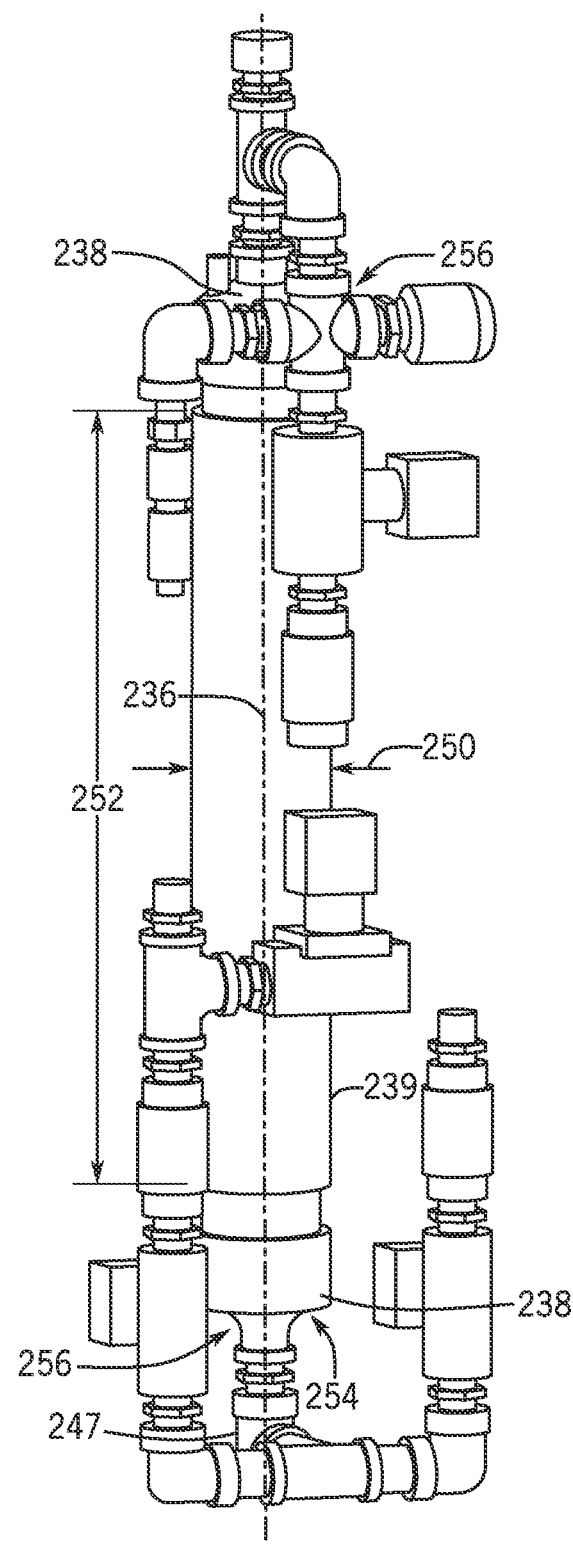
FIG. 13 is a perspective view of an embodiment of the emission canister, in accordance with an embodiment of the present disclosure.

FIG. 13 is a perspective view of an embodiment of the emission canister 164 that may be configured to increase an exposure time and/or surface area that the adsorbate may contact while interacting with the adsorbent 166. For example, the emission canister 164 may include a radial dimension 250 (e.g., a diameter) and a vertical dimension 252 (e.g., a height or a length). Increasing a ratio of height (e.g., the vertical dimension 252) to diameter (e.g., the radial dimension 250) of the emission canister 164 may improve the ability of the adsorbent 166 to adsorb the adsorbate. For example, in some embodiments, a ratio of height to diameter of the emission canister 164 may be between 3:1 and 4:1. In other embodiments, the ratio of height to diameter may be any suitable ratio that enables sufficient adsorption of adsorbate.

Increasing the ratio of height to diameter decreases an amount of adsorbent 166 within the emission canister 164 that may not contact significant amounts of adsorbate. For example, adsorbent 166 disposed proximate to an edge 254 at ends 256 of the emission canister 164 (e.g., an internal perimeter of the cap 238) may contact and/or receive less adsorbate than adsorbent 166 disposed along the central axis 236 of the emission canister 164 and/or adsorbent 166 that is axially aligned with an adsorbate inlet 247 of the emission canister 164. Overall, a surface area in which the adsorbate contacts the adsorbent 166 may be increased by increasing the ratio of height to diameter of the emission canister 164.

In addition, increasing the ratio of the vertical dimension 252 to the radial dimension 250 may enable more effective heating of the adsorbent 166 through the single heating element and/or the dual heating elements 232, 234 disposed within the emission canister 164, due to less thermal resistance caused by the adsorbent 166 (e.g., a width of the adsorbent 166 extending in a radial direction of the emission canister 164 may be substantially small). For example, heat released from the dual heating elements 232, 234 may travel a shorter distance from the central axis 236 to heat the adsorbent 166 positioned proximate to the interior surface 239 of the emission canister 164.

Figure 14:
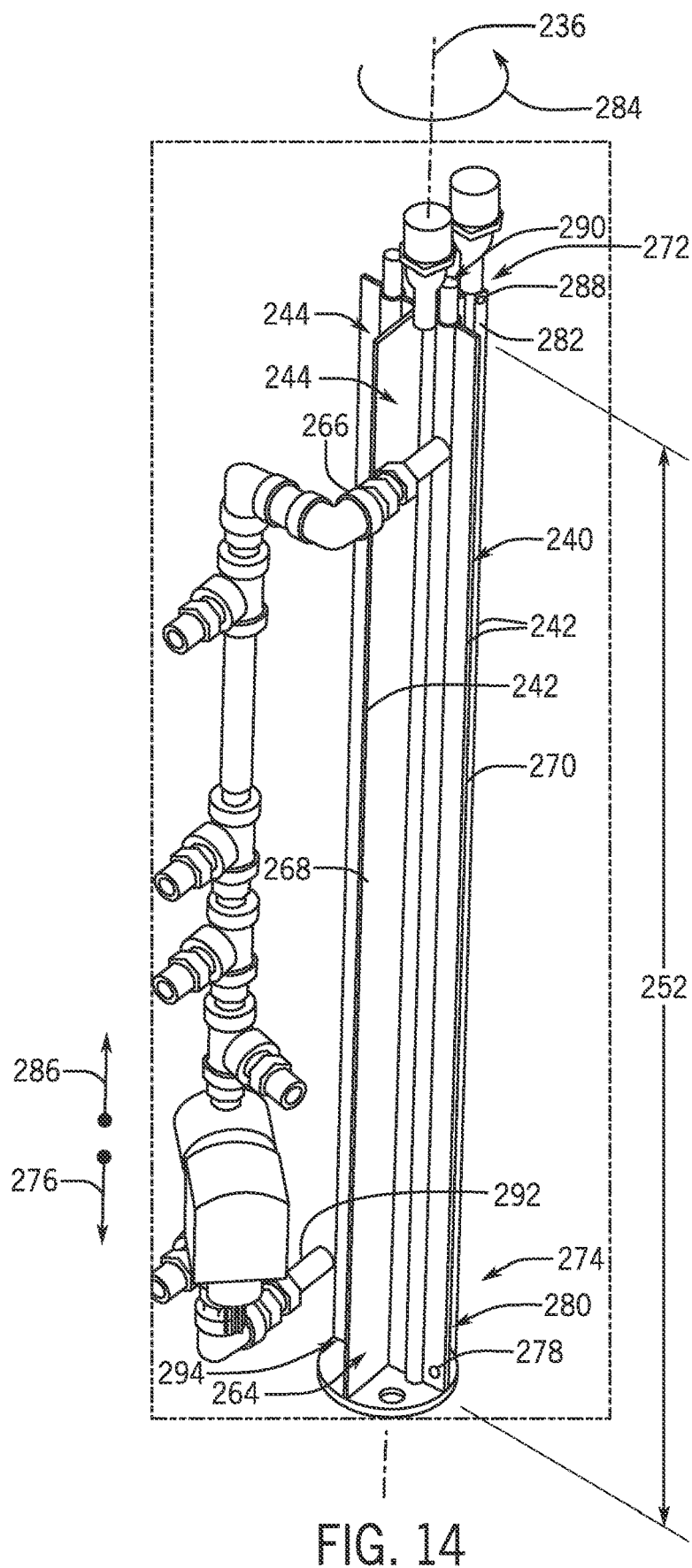
FIG. 14 is a perspective view of an embodiment of a baffled divider that may be disposed within the emission canister, in accordance with an embodiment of the present disclosure.

FIG. 14 is a perspective view of an embodiment of the baffled divider 240. As noted above, the baffled divider 240 may segregate an interior of the emission canister 164 into the chambers 244, which may extend along the vertical dimension 252 (e.g., a height) of the emission canister 164. In some embodiments, the baffled divider 240 may be configured to direct a mixture of adsorbate and the non-condensable gases 138 through each of the chambers 244 in series, and thus, increase an exposure time between the gas flow mixture and the adsorbent 166. In addition, the baffled divider 240 may increase a surface area of the adsorbent 166 contacted by the gas flow mixture as the gas flows through the emission canister 164. Accordingly, the baffled divider 240 may enhance interaction between the adsorbent 166 and the adsorbate flowing through the emission canister 164. That is, the baffled divider 240 may enhance an effectiveness of the emission canister 164 by facilitating the separation of adsorbate from the non-condensable gases 138.

For example, a first chamber 264 of the plurality of chambers 244 may be configured to receive a flow of the adsorbate and the non-condensable gases 138 from an inlet conduit 266 of the emission canister 164. For clarity, it should be noted that the first chamber 264 is defined by a first fin 268 and a second fin 270 (e.g., an adjacent fin) of the plurality of fins 242. The adsorbate and the non-condensable gases 138 may flow in a first direction 276 along the central axis 236 from a first end portion 272 of the emission canister 164 (e.g., an end portion proximate the inlet conduit 266) toward a second end portion 274, opposite the first end portion 272, of the emission canister 164. In this manner, the adsorbate may interact with substantially all of the adsorbent 166 disposed within the first chamber 264.

As shown in the illustrated embodiment, a first aperture 278 is defined within the second fin 270, near the second end portion 274 of the emission canister 164. The first aperture 278 is configured to extend between and fluidly couple the first chamber 264 to a second chamber 280 of the chambers 244. Similar to the first chamber 264, the second chamber 280 is defined between the second fin 270 and a third fin 282 (e.g., a fin adjacent to the second fin 270 with respect to a counterclockwise direction 284 about the central axis 236). Accordingly, a gas flow of adsorbate and non-condensable gases 138 may flow from the first chamber 264 to the second chamber 280 via the first aperture 278. It should be noted that the first fin 268 does not include an aperture, such that gas flow from the first chamber 264 through the first fin 268 is blocked.

Upon entry into the second chamber 280, the adsorbate and the non-condensable gases 138 may flow in a second direction 286 along the central axis 236 (e.g. a direction opposite the first direction 276) from the second end portion 274 to the first end portion 272 of the emission canister 164. Accordingly, the adsorbate and the non-condensable gases 138 may interact with substantially all of the adsorbent 166 disposed within the second chamber 280. The third fin 282 includes a second aperture 288 configured to fluidly couple the second chamber 280 to a third chamber 290 (e.g., a chamber adjacent to the second chamber 280 with respect to the counterclockwise direction 284). Accordingly, the adsorbate and the non-condensable gases 138 may flow through the third chamber 290 in the first direction 276. It should be noted that each fin (with the exception of the first fin 268) includes an aperture defined therein, thereby enabling the adsorbate and the non-condensable gases 138 to flow through each of the chambers 244 in series and in the counterclockwise direction 284 from the first chamber 264. In particular, an aperture within a subsequent fin may be located near an end portion 272, 274 of the emission canister 164 that is opposite an end portion 272, 274 of the emission canister 164 in which an aperture of an adjacent fin is positioned. In this manner, the adsorbate and the non-condensable gases 138 sequentially traverse from the first chamber 264 through each of the chambers 244 about the central axis 236 and in a serpentine pattern along the vertical dimension 252 of the emission canister 164. As such, the non-condensable gases 138 may discharge from the emission canister 164 via an outlet conduit 292 that is coupled to a fifth chamber 294 (e.g., a last chamber, a terminal chamber) of the chambers 244. Directing the flow of the adsorbate and the non-condensable gases 138 in series through the chambers 244 enables substantially all of the adsorbate to be adsorbed by the adsorbent 166. It should be noted that in other embodiments, the fins 242 may not include an aperture and the adsorbate and the non-condensable gases 138 may flow through the chambers 244 in parallel.

Figure 15:
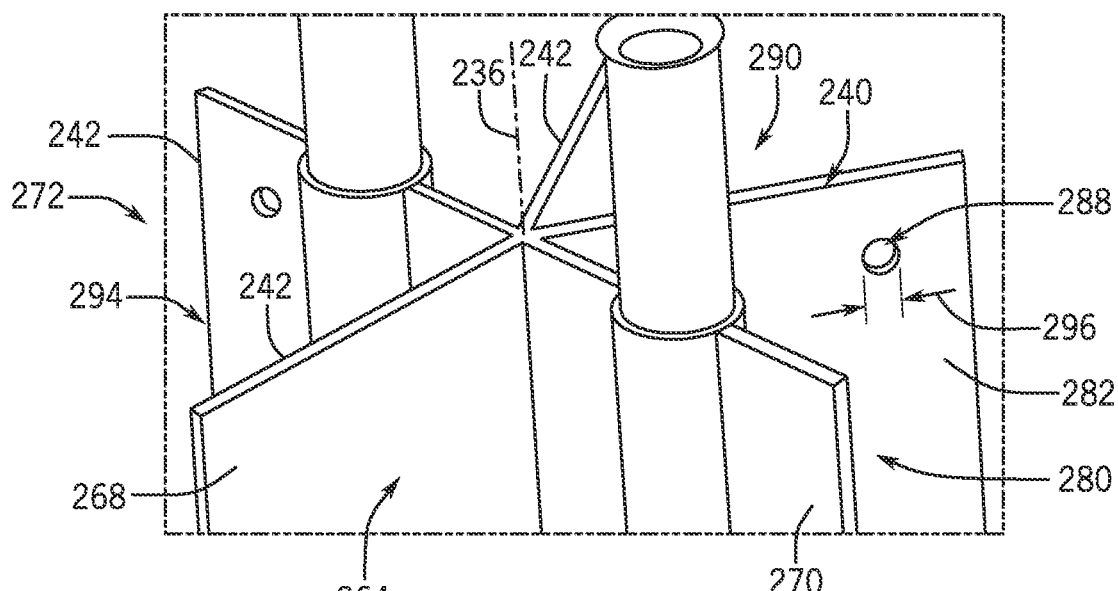
FIG. 15 is an expanded perspective view of an embodiment of the baffled divider of FIG. 14, in accordance with an embodiment of the present disclosure.

FIG. 15 is an expanded perspective view of an embodiment of the baffled divider 240, near the first end portion 272 of the emission canister 164. In some embodiments, a diameter 296 of the apertures (e.g., the first aperture 278, the second aperture 288, etc.) within the fins 242 may be between about (e.g., within 10% of, within 5% of, or within 1% of) 0.5 millimeters (mm) and about 5 mm, between about 1 mm and about 4 mm, or about 3 mm. In other embodiments, the diameter 296 of the apertures may be less than 0.5 mm or greater than 5 mm. In certain embodiments, each of the fins 242 may include a plurality of apertures disposed therein. Moreover, in some embodiments, the apertures may include a non-circular cross section. For example, the apertures may include a quadrilateral slot, an oval, or an opening having any other suitable geometric profile.

System for Facilitating Emission Canister Maintenance

Typical emission canisters often include end plates (e.g., cap plates) that are fixedly attached (e.g., via an adhesive, brazing, welding, and/or crimp connections) to a housing of the emission canister. Therefore, a significant time period may be involved in removing the end plates of conventional emission canisters to obtain access to components disposed within the emission canister.

Figure 16:
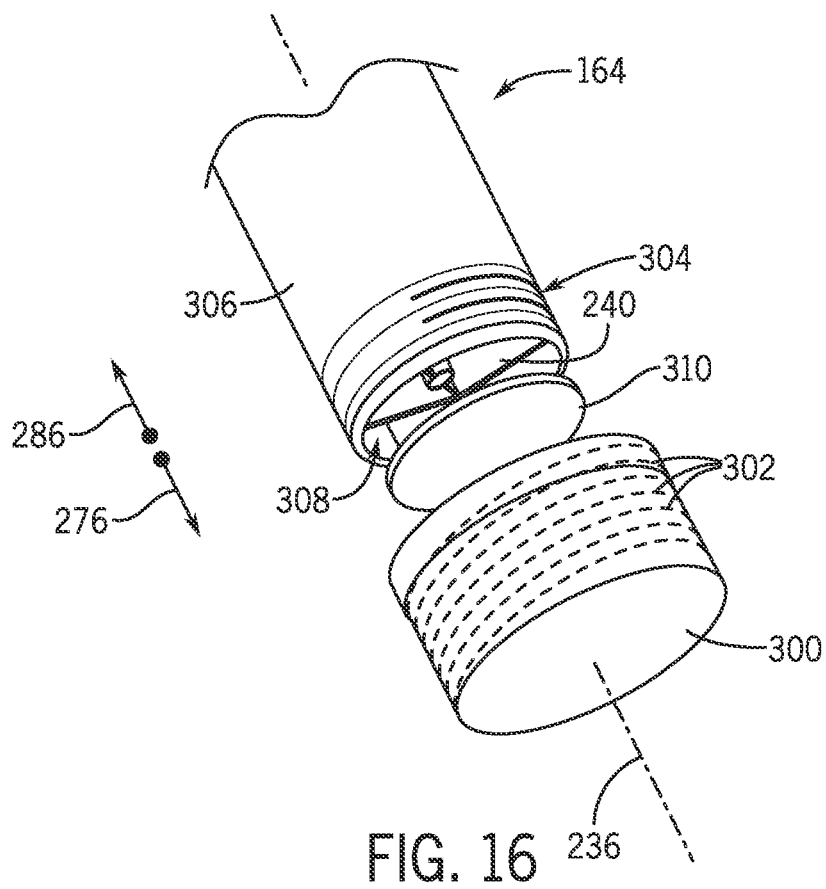
FIG. 16 is a perspective view of an embodiment of an access cap that may be included with the emission canister, in accordance with an embodiment of the present disclosure.

FIG. 16 is a perspective view of an embodiment of an end plate, or an access cap 300, which may be removably coupled to the emission canister 164, and thus, facilitate performing maintenance operations on components disposed within the emission canister 164. The access cap 300 may include internal threads 302 that are configured to engage with external threads 304 disposed about a housing 306 of the emission canister 164. In this manner, the access cap 300 may be threaded or unthreaded from the housing 306, thereby facilitating access to an interior 308 of the emission canister 164. It should be noted that in other embodiments, the access cap 300 may include external threads, while the housing 306 of the emission canister 164 includes internal threads.

In any case, upon removing the access cap 300, a service technician may slide the baffled divider 240 in the first direction 276 (e.g., along the central axis 236) to remove the baffled divider 240 and the adsorbent 166 from the emission canister 164. Accordingly, the service technician may inspect the adsorbent 166 and/or replace the adsorbent 166 with new adsorbent. In addition, the service technician may inspect and/or replace the dual heating elements 232, 234 disposed within the baffled divider 240, or any other components disposed within the housing 306 and/or the interior 308 of the emission canister 164. In certain embodiments, a gasket 310 is disposed between the housing 306 of the emission canister 164 and the access cap 300. The gasket 310 may facilitate formation of a fluidic seal (e.g., a fluid-tight seal) between the housing 306 and the access cap 300 when the access cap 300 is threaded and torqued onto the housing 306. It should be noted that the access cap 300 may be included in the first end portion 272 of the emission canister 164, the second end portion 274 of the emission canister 164, or both.

System for Faster Cooldown of Emission Canister

Figure 17:
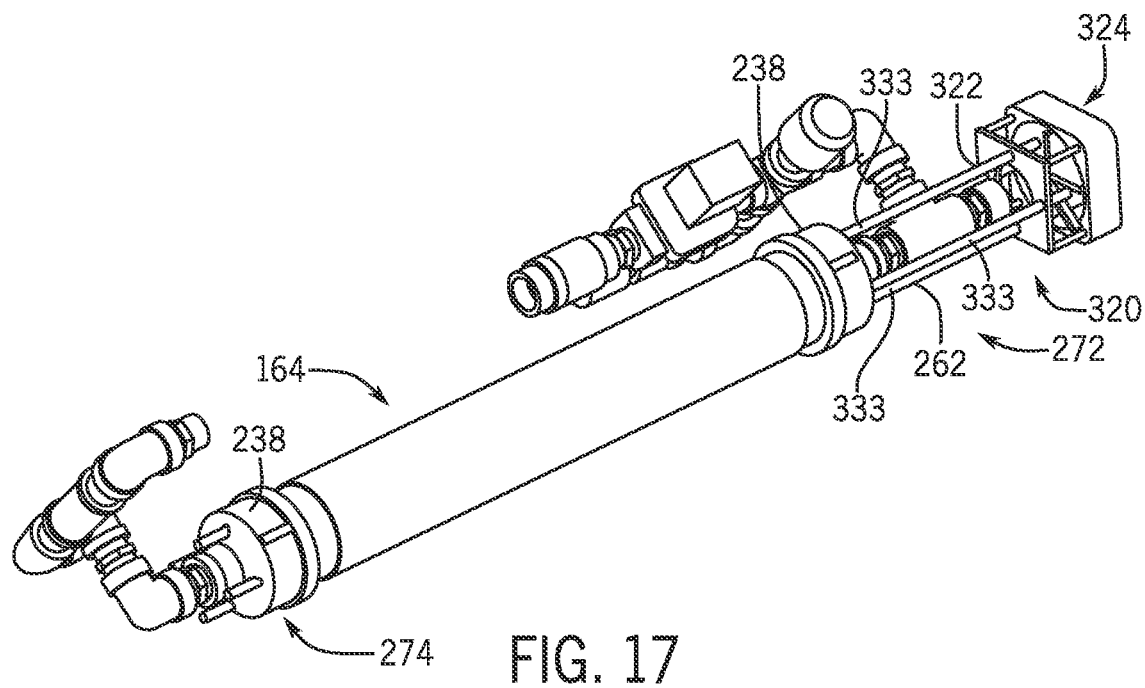
FIG. 17 is a perspective view of an embodiment of a cooling system for the emission canister, in accordance with an embodiment of the present disclosure.

FIG. 17 illustrates an embodiment of a cooling system 320 that may be used to thermally regulate the adsorbent 166 and/or the adsorbate within the emission canister 164. In some embodiments, the adsorbent 166 may adsorb the adsorbate more effectively when the adsorbent 166 and/or the adsorbate are at a reduced temperature. During the regeneration cycle, the internal temperature of the emission canister 164 may rise significantly (e.g., 200 degrees Fahrenheit or more) and such temperatures may reduce the ability of the adsorbent 166 to adsorb the adsorbate (e.g., new adsorbate entering the emission canister 164 from the vapor compression system 14 subsequent to completion of the regeneration cycle). Typically, the emission canister 164 may undergo a cooldown phase after the regeneration cycle has been completed and before the adsorbent 166 begins adsorbing the adsorbate. The emission canister 164 may be insulated and therefore a significant amount of time may lapse before cooling the emission canister 164 to a sufficient operational temperature for adsorption. As such, it may be desirable to couple the cooling system 320 to the emission canister 164, which may decrease the cooling time of the emission canister 164 after regeneration.

The cooling system 320 may include one or more cooling passages 322 (e.g., internal cooling passages) that extend from the first end portion 272 to the second end portion 274 of the emission canister 164. For clarity, it should be noted that the cooling passages 322 may be defined by respective cooling conduits 333 (e.g., piping, tubing, etc.) that extend between the first and second end portions 272, 274 of the emission canister 164. In some embodiments, the cooling passages 322 may extend through the caps 238 (e.g., the access caps 300) of the emission canister 164 and may be embedded within the adsorbent 166 disposed within the emission canister 164. Further, a fan 324 may be coupled to the first end portion 272 of the cooling passages 322 to direct a cooling fluid (e.g., air) through the cooling passages 322 from the first end portion 272 to the second end portion 274 of the emission canister 164. The cooling fluid may absorb thermal energy (e.g., heat) from the emission canister 164 and/or the adsorbent 166 and transfer the thermal energy to the ambient environment. As such, the cooling passages 322 may reduce the cooling time of the emission canister 164 after regeneration. Although four cooling passages 322 are shown in the illustrated embodiment of FIG. 13, the cooling system 320 may include 1, 2, 3, 5, or more, cooling passages 322. In some embodiments, the cooling passages 322 may include internal and/or external fins that may improve the ability of the cooling passages 322 to absorb thermal energy within the emission canister 164 (e.g., by increasing a heat transfer surface area of the cooling passages 322).

Figure 18:
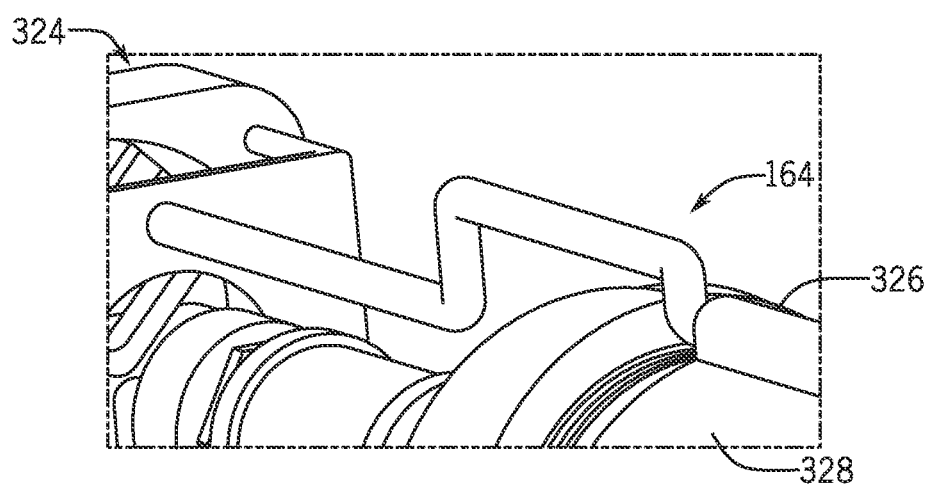
FIG. 18 is an expanded perspective view of an embodiment of the cooling system of FIG. 17, illustrating external cooling passages disposed about an outer surface of the emission canister, in accordance with an embodiment of the present disclosure.

FIG. 18 is an expanded perspective view of an embodiment of external cooling passages 326 that may be used in addition to, or in lieu of, the cooling passages 322 shown in FIG. 17. The external cooling passages 326 may be disposed circumferentially about an exterior surface 328 of the emission canister 164. In other embodiments, an insulating layer may be disposed over the external cooling passages 326 to enhance thermal energy transfer between the external cooling passages 326 and the exterior surface 328 of the emission canister 164. In some embodiments, the external cooling passages 326 may not extend through the caps 238 and/or the adsorbent 166 of the emission canister 164. In any case, the fan 324 may be switched off during the regeneration cycle to maintain heat within the emission canister 164. As such, the cooling passages 322, 326 may not receive a flow of cooling fluid and will not remove heat from the emission canister 164 during regeneration.

It should be noted that any suitable cooling fluid may be directed through the cooling passages 322, 326 to remove thermal energy from the emission canister 164 and the adsorbent 166 disposed therein. For example, in certain embodiments, the fan 324 may include a pump (e.g., a centrifugal pump) or other flow generating device that is configured to direct a liquid (e.g., water) through the conduits 333 of the cooling passages 322, 326. Accordingly, the liquid may absorb thermal energy from the emission canister 164. As another example, the conduits 333 may be configured to flow refrigerant from the vapor compression system 14, such that the refrigerant may absorb thermal energy from the emission canister 164 and the adsorbent 166. Further, in embodiments of the emission canister 164 having the baffled divider 240, the cooling passages 322 may be formed within (e.g., integrally with) one or more of the fins 242. Accordingly, a suitable cooling fluid flowing through the cooling passages 322 may absorb thermal energy from the baffled divider 240, thereby cooling the adsorbent 166 disposed about an exterior of the baffled divider 240.

System for Emission Canister Vacuum Regeneration

Conventional purge systems generally include one or more vacuum pumps that are configured to drive operation of the purge system. For example, conventional purge systems may be equipped with a first vacuum pump configured to draw a mixture of refrigerant and non-condensable gases 138 through the heat exchanger 142 to enable removal and/or separation of the non-condensable gases 138 from the refrigerant of the vapor compression system 14. A second vacuum pump may be configured to facilitate regeneration of the emission canister 164 when the emission canister 164 is saturated with refrigerant (e.g., adsorbate). For example, upon saturation of the emission canister 164, typical purge systems activate the second vacuum pump to substantially reduce a pressure within the emission canister 164 to remove the adsorbate from the adsorbent 166 and ultimately direct the adsorbate back into the vapor compression system 14. Unfortunately, including multiple vacuum pumps within the purge system 100 may increase assembly costs, operating costs, and/or maintenance costs of the purge system 100.

Figure 19:
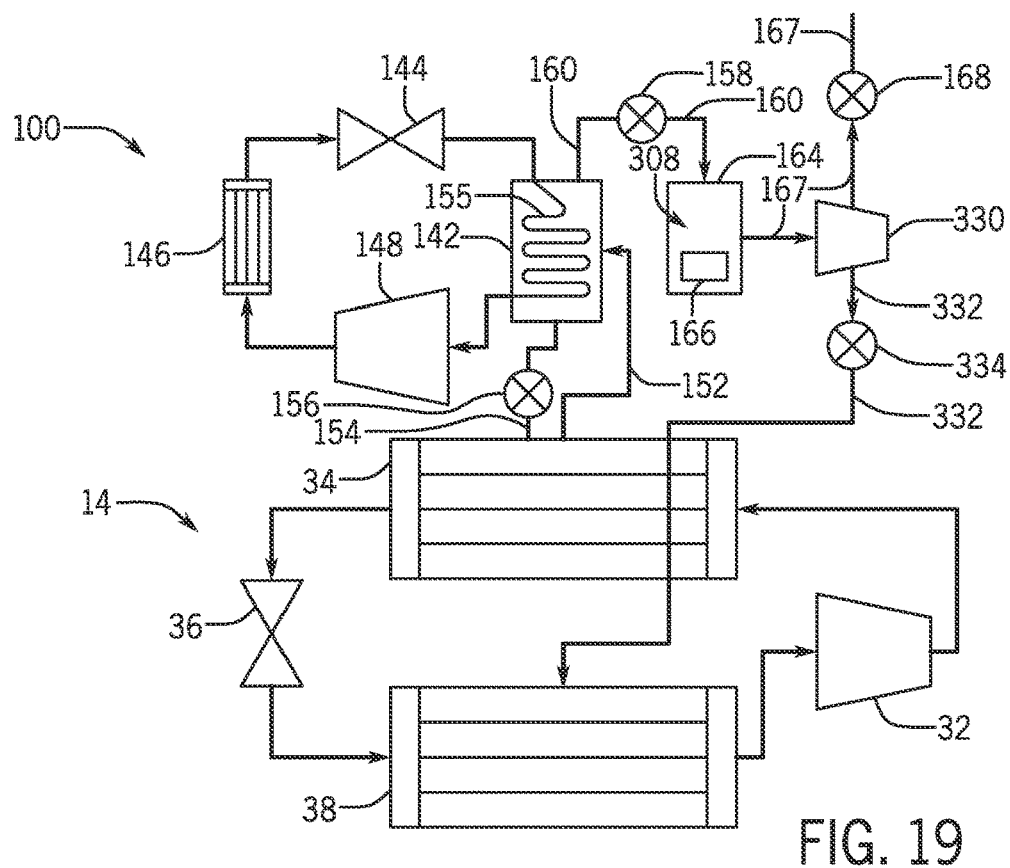
FIG. 19 is a schematic of an embodiment of the vapor compression system having a central vacuum pump coupled to the purge system, in accordance with an embodiment of the present disclosure.

FIG. 19 is a schematic of an embodiment of the purge system 100, which includes a central vacuum pump 330 (e.g., a single vacuum pump) that is configured to facilitate removal of adsorbate from the emission canister 164 via vacuum regeneration. In certain embodiments, the central vacuum pump 330 may also assist drawing refrigerant into the heat exchanger 142 of the purge system 100 in addition to, or in lieu of a thermal siphon effect generated via condensation of refrigerant within the heat exchanger 142. Accordingly, the purge system 100 may be operated using a single vacuum pump, rather than a plurality of vacuum pumps.

As shown in the illustrated embodiment, the central vacuum pump 330 is in fluid communication with the exhaust vent 167 of the emission canister 164. The purge system 100 also includes an outlet conduit 332 that extends between and fluidly couples the central vacuum pump 330 to the evaporator 38. An outlet valve 334 is coupled to the outlet conduit 332 and is configured to enable or disable fluid flow from the emission canister 164 through the outlet conduit 332. Accordingly, the discharge valve 158, the exhaust valve 168, the outlet valve 334, and the central vacuum pump 330 may cooperate to enable the purge system 100 to operate in a purge mode (e.g., the saturation cycle) to purge the vapor compression system 14, as well as enable the emission canister 164 to facilitate removal of adsorbate from the adsorbent 166 via vacuum regeneration (e.g., a vacuum regeneration cycle).

For example, in the purge mode (e.g., the saturation cycle), the discharge valve 158 and the exhaust valve 168 are in an open position, while the outlet valve 334 is in a closed position. Accordingly, the central vacuum pump 330 may draw a mixture of refrigerant and the non-condensable gases 138 into the heat exchanger 142 via the inlet tube 152 and direct the mixture through the discharge conduit 160 and into the emission canister 164. As discussed above, the adsorbent 166 may adsorb substantially all of the refrigerant from the mixture of refrigerant and non-condensable gases 138. As such, the central vacuum pump 330 may direct and discharge the non-condensable gases 138 from the purge system 100 via the exhaust vent 167 of the emission canister 164.

Upon saturation of the emission canister 164, the central vacuum pump 330 may facilitate removal of adsorbate from the adsorbent 166 in the emission canister 164 via vacuum regeneration. For example, in a vacuum regeneration mode, the discharge valve 158 and the exhaust valve 168 are adjusted to a closed position (e.g., via the control panel 40), while the outlet valve 334 is adjusted to an open position (e.g., via the control panel 40). Accordingly, the central vacuum pump 330 may generate a vacuum within the emission canister 164 or, in other words, substantially reduce a pressure within the emission canister 164 (e.g., with respect to a pressure of the ambient environment and/or a portion of the vapor compression system 14). In some embodiments, reducing a pressure within the emission canister 164 may cause the adsorbate to undergo a phase change (e.g., boil), thereby releasing the adsorbate from the pores of the adsorbent 166. The central vacuum pump 330 may intake the released adsorbate (e.g., via a suction side of the central vacuum pump 330), and force the adsorbate through an outlet of the central vacuum pump 330 and into the outlet conduit 332. Accordingly, the adsorbate may flow through the outlet conduit 332 and into the evaporator 38 of the vapor compression system 14. In this manner, the central vacuum pump 330 may be utilized to perform vacuum regeneration between successive saturation cycles to release adsorbate previously adsorbed by the adsorbent 166.

Figure 20:
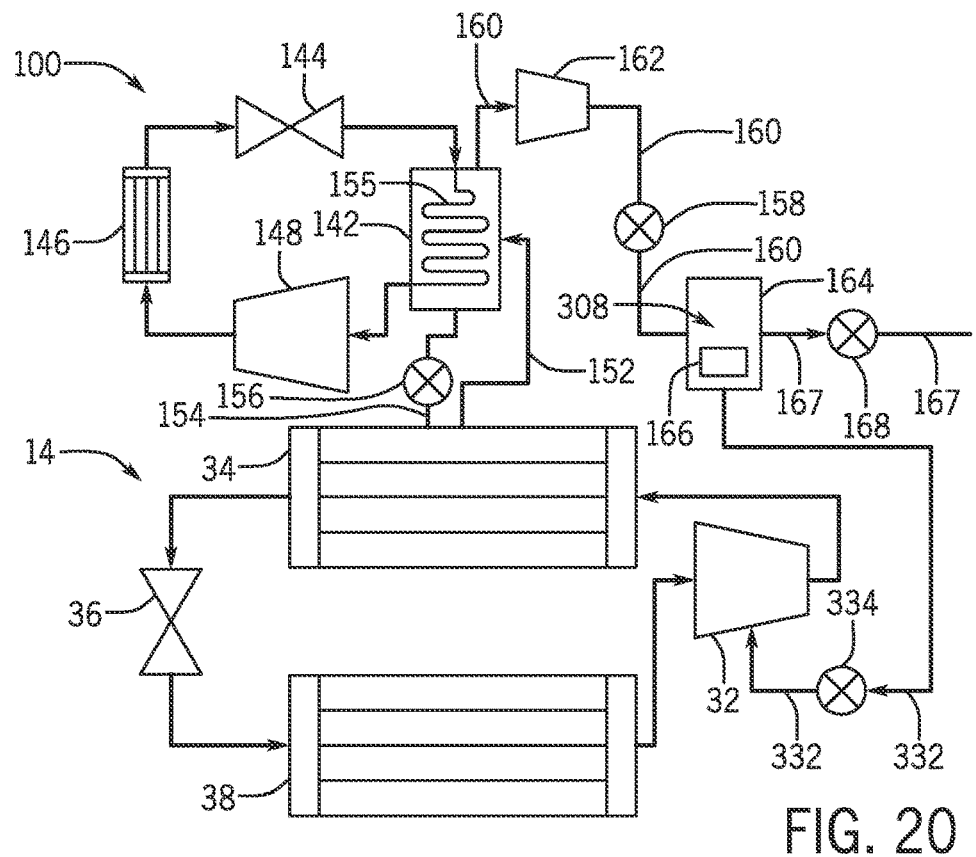
FIG. 20 is a schematic of an embodiment of the vapor compression system, in accordance with an embodiment of the present disclosure.

In some embodiments, the compressor 32 of the vapor compression system 14 may be used facilitate vacuum regeneration of the emission canister 164 in addition to, or in lieu of, the central vacuum pump 330. For example, FIG. 20 illustrates a schematic of an embodiment of the purge system 100 having the compressor 32 in fluid communication with the emission canister 164. As shown in the illustrated embodiment, the outlet conduit 332 fluidly couples the compressor 32 (e.g., a suction side of the compressor 32) to the emission canister 164. Accordingly, the compressor 32 may be used to depressurize (e.g., reduce the pressure within) the emission canister 164 during vacuum regeneration cycles of the emission canister 164. That is, during vacuum regeneration of the emission canister 164, the discharge valve 158 and the exhaust valve 168 may be adjusted to the closed position (e.g., via the control panel 40), while the outlet valve 334 is adjusted to the open position (e.g., via the control panel 40). Accordingly, operation of the compressor 32 may also be used to depressurize the interior 308 of the emission canister 164 and enable the emission canister 164 to undergo vacuum regeneration.

In some embodiments, a combined regeneration cycle may be used to enhance a regeneration rate of the emission canister 164. For example, the combined regeneration cycle may involve operating one or more heating elements of the emission canister 164 in concurrence with the central vacuum pump 330, the compressor 32, another suitable vacuum pump configured to depressurize the emission canister 164, or any combination thereof. That is, the combined regeneration cycle may involve simultaneous thermal regeneration and vacuum regeneration of the emission canister 164.

Figure 21:
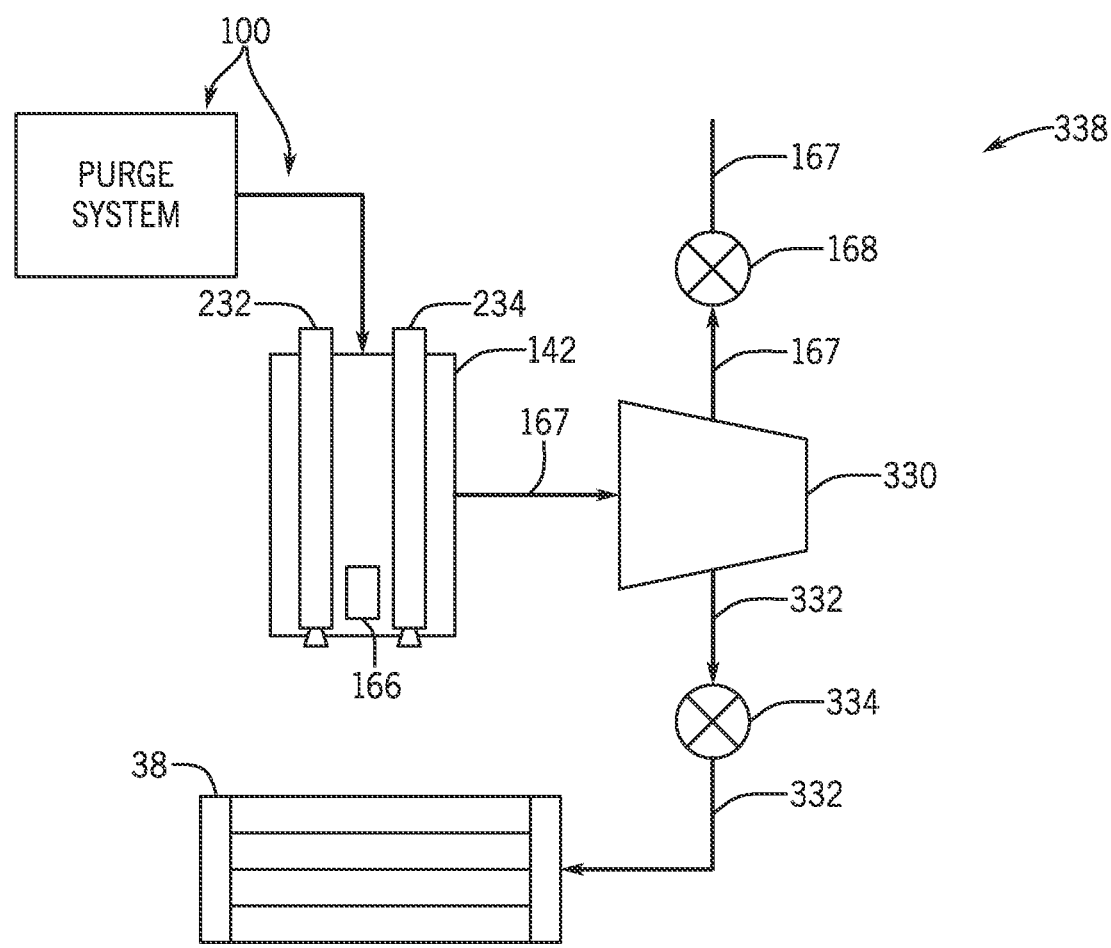
FIG. 21 is a partial schematic of an embodiment of the vapor compression system having heating elements extending through the emission canister, in accordance with an embodiment of the present disclosure.

For example, FIG. 21 is a schematic of an embodiment of a portion 338 of the purge system 100 that is configured to enable concurrent vacuum regeneration and thermal regeneration of the emission canister 164. In this combined regeneration cycle, the dual heating elements 232, 234 may be used to supply thermal energy (e.g., heat) to the emission canister 164, while the central vacuum pump 330 depressurizes the emission canister 164. As noted above, heating the adsorbent 166 may facilitate releasing adsorbate disposed within pores of the adsorbent 166. Therefore, heating the adsorbent 166 while simultaneously depressurizing the emission canister 164 may enhance a rate at which adsorbate releases from the adsorbent 166. In this manner, a time period for conducting regeneration using the combined regeneration cycle may be reduced.

In certain embodiments, cooperatively operating both a vacuum pump (e.g., the central vacuum pump 330) and a heating element (e.g., the dual heating elements 232, 234) to regenerate the emission canister 164 may enable the vacuum pump and/or the heating element to operate at a reduced capacity as compared to an operational capacity of the vacuum pump alone during a conventional vacuum regeneration cycle and an operational capacity of the heating element alone during a conventional thermal regeneration cycle. That is, because both the central vacuum pump 330 and the dual heating elements 232, 234 operate concurrently during the combined regeneration cycle, the central vacuum pump 330 and the dual heating elements 232, 234 may each supply a portion of the energy involved in regenerating the emission canister 164 rather than individually suppling all of the energy involved in regenerating the emission canister 164. Accordingly, an operational life of the central vacuum pump 330 may be increased by reducing wear (e.g., material fatigue) on the central vacuum pump 330. Similarly, a reduction in an amount of thermal energy supplied by the dual heating elements 232, 234 may be reduced, which may enhance an operation life of the adsorbent 166.

Pump Control System for Purge System

Existing purge systems typically activate the vacuum pump 162 to purge the vapor compression system 14 regardless of a pressure within the heat exchanger 142 and/or portions of the vapor compression system 14. Similarly, typical purge systems generally operate an additional vacuum pump during the vacuum regeneration of the emission canister 164 irrespective of a pressure within the emission canister 164 and/or portions of the vapor compression system 14. Unfortunately, operating one or more vacuum pumps of the purge system 100 regardless of a pressure within the heat exchanger 142, a pressure within the emission canister 164, and/or a pressure within portions of the vapor compression system 14 may result in inefficient operation of the purge system 100.

Figure 22:
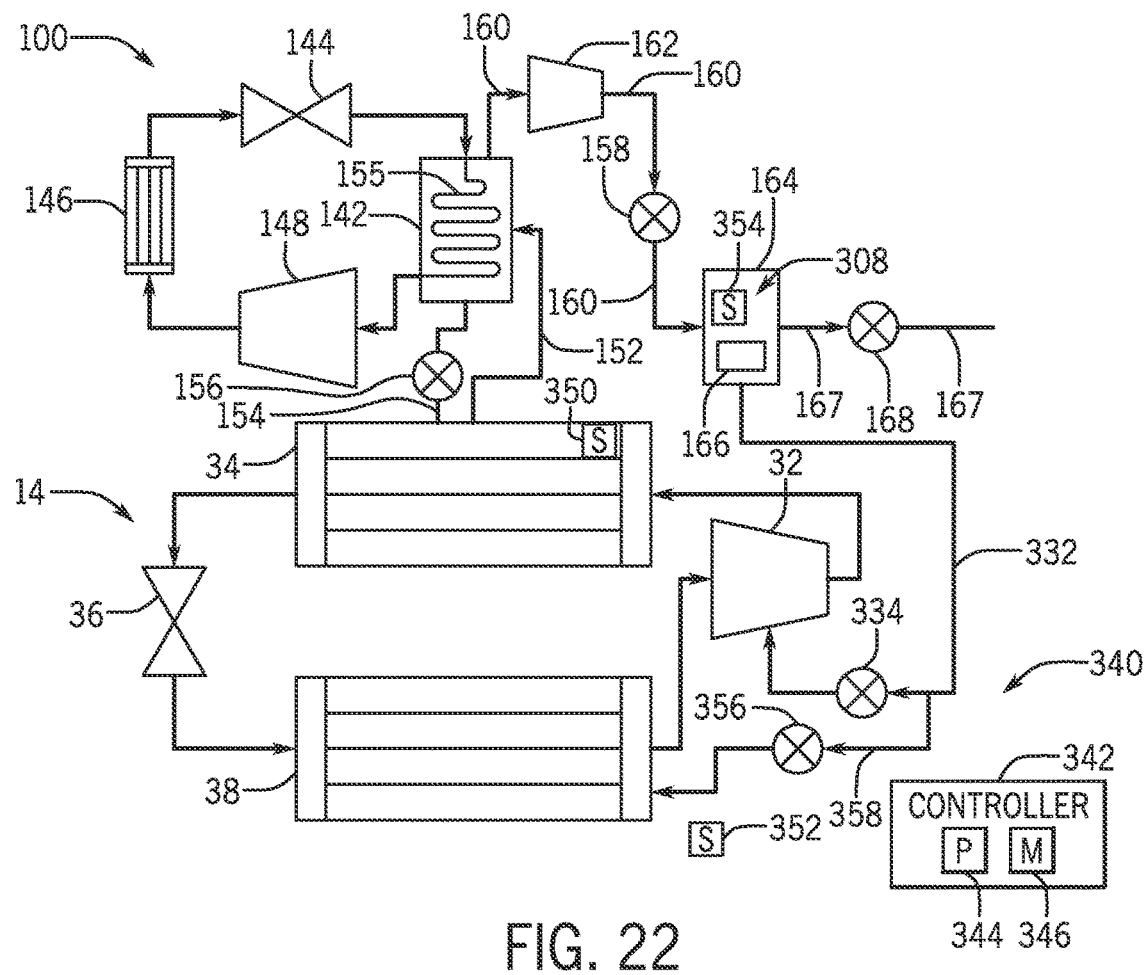
FIG. 22 is a schematic of an embodiment of the vapor compression system having a pump control system, in accordance with an embodiment of the present disclosure.

FIG. 22 is a schematic of an embodiment of the purge system 100 having a pump control system 340 that is configured to deactivate the vacuum pump 162 based on feedback received from the vapor compression system 14 (e.g., sensors, the control panel or other controllers of the vapor compression system 14). More specifically, the pump control system 340 may deactivate the vacuum pump 162 when a pressure differential between the condenser 34 and an ambient environment or the emission canister 164 is sufficient to force refrigerant and non-condensable gases 138 from the condenser 34 through the heat exchanger 142 and the emission canister 164 without assistance from the vacuum pump 162. For example, the pump control system 340 may deactivate the vacuum pump 162 when a pressure within the condenser 34 is a target percentage greater than a pressure of an ambient environment (e.g., the atmosphere) surrounding the vapor compression system 14 (e.g., a pressure at the exhaust vent 167). As described in greater detail herein, the pump control system 340 may reduce operation of the vacuum pump 162 during certain operational periods of the purge system 100, and thus, enhance an efficiency of the purge system 100.

As shown in the illustrated embodiment of FIG. 22, the pump control system 340 includes a controller 342 (e.g., the control panel 40 or a separate controller), or a plurality of controllers, which may be used to control certain components of the vapor compression system 14 and/or the purge system 100. For example, one or more control transfer devices, such as wires, cables, wireless communication devices, and the like, may communicatively couple the compressor 32 (e.g., motor 50 or the VSD 52), the vacuum pump 162 (e.g., a motor of the vacuum pump 162), the discharge valve 158, the exhaust valve 168, the outlet valve 334, or any other suitable component(s) of the vapor compression system 14 and/or the purge system 100 to the controller 342. The controller 342 may include a processor 344, such as a microprocessor, which may execute software for controlling the components of the vapor compression system 14 and/or the purge system 100. Moreover, the processor 344 may include multiple microprocessors, one or more "general-purpose" microprocessors, one or more special-purpose microprocessors, and/or one or more application specific integrated circuits (ASICS), or some combination thereof.

For example, the processor 344 may include one or more reduced instruction set (RISC) processors. The controller 342 may also include a memory device 346 that may store information such as control software, look up tables, configuration data, etc. The memory device 346 may include a volatile memory, such as random access memory (RAM), and/or a nonvolatile memory, such as read-only memory (ROM). The memory device 346 may store a variety of information and may be used for various purposes. For example, the memory device 346 may store processor-executable instructions including firmware or software for the processor 344 to execute, such as instructions for controlling the components of the vapor compression system 14 and/or the purge system 100. In some embodiments, the memory device 346 is a tangible, non-transitory, machine-readable-medium that may store machine-readable instructions for the processor 344 to execute. The memory device 346 may include ROM, flash memory, a hard drive, or any other suitable optical, magnetic, or solid-state storage medium, or a combination thereof. The memory device 346 may store data, instructions, and any other suitable data.

In some embodiments, the controller 342 may be communicatively coupled to a first pressure sensor 350 configured to provide the controller 342 with feedback indicative of a pressure (e.g., a refrigerant pressure) within the condenser 34. In addition, the controller 342 may be communicatively coupled to a second pressure sensor 352 configured provide the controller 342 with feedback indicative of a pressure of ambient atmospheric air (e.g., a pressure at the exhaust vent 167). The controller 342 may compare a pressure within the condenser 34 to a pressure of the ambient environment during operation of the purge system 100. In some embodiments, the controller 342 may deactivate the vacuum pump 162 if a pressure within the condenser 34 exceeds a pressure of the ambient environment by a threshold amount (e.g., 0.05 bar, 0.1 bar, 0.5 bar, 2 bar) or percentage (e.g., greater than 10%, greater than 20%, greater than 30%). That is, if the purge system 100 is operating in the purge mode (e.g., the saturation cycle), and the pressure differential between the refrigerant within the condenser 34 and the ambient environment is sufficient to force the refrigerant and the non-condensable gases 138 from the condenser 34 and into the heat exchanger 142, the controller 342 may deactivate, reduce a speed of, or shut down the vacuum pump 162. Similarly, if a natural pressure differential between the heat exchanger 142 and the condenser 34 (e.g., a pressure differential generated via condensing refrigerant within the heat exchanger 142) is sufficient to force refrigerant and non-condensable gases 138 from the condenser 34 into the heat exchanger 142, the controller 342 may deactivate the vacuum pump 162 or reduce a speed of the vacuum pump 162. Accordingly, the pressure differential between the condenser 34 and the ambient environment and/or the condenser 34 and the heat exchanger 142 may force the refrigerant and the non-condensable gases 138 through the purge system 100, such that the adsorbent 166 within the emission canister 164 may adsorb the refrigerant (e.g., adsorbate) and enable the non-condensable gases 138 to discharge into the ambient environment via the exhaust vent 167. In this manner, the pump control system 340 may reduce inefficient operation of the vacuum pump 162.

In certain embodiments, the controller 342 may continuously or intermittently evaluate the pressure differential between gas (e.g., the refrigerant and the non-condensable gases 138) within the condenser 34 and the ambient environment after adjusting operation of the vacuum pump 162 (e.g., deactivating, reducing a speed of, or shutting down the vacuum pump). If a pressure within the condenser 34 falls below an ambient pressure, or falls within a threshold range of the ambient pressure, the controller 342 may send a signal to reactivate or increase a speed of the vacuum pump 162 to draw refrigerant and non-condensable gases 138 from the condenser 34 into the purge system 100. Accordingly, the controller 342 may maintain a pressure differential between the condenser 34 and the heat exchanger 142 that is sufficient to direct a flow of the refrigerant and the non-condensable gases 138 through the heat exchanger 142 and into the emission canister 164.

Although the first pressure sensor 350 is configured to monitor a pressure within the condenser 34 in the illustrated embodiment of FIG. 22, it should be noted that the pump control system 340 may be communicatively coupled to additional sensors in addition to, or in lieu of, the first pressure sensor 350. The additional sensors may be configured to measure a pressure within various other components of the vapor compression system 14 and/or the purge system 100. For example, the pump control system 340 may be communicatively coupled to one or more pressure sensors configured to monitor pressures of the compressor 32, the evaporator 38, the heat exchanger 142, the emission canister 164, one or more conduits of the vapor compression system 14 and/or the purge system 100, or any other suitable component(s) of the vapor compression system 14 and/or the purge system 100. In some embodiments, the controller 342 may determine a suitable operational period to deactivate the vacuum pump 162 based on feedback provided by these additional pressure sensors. For example, the controller 342 may be configured to deactivate the vacuum pump 162 when a pressure within the compressor 32, the evaporator 38, the heat exchanger 142, and/or the emission canister 164 exceeds a pressure of the ambient environment by a threshold amount.

In some embodiments, the pump control system 340 may be configured to adjust a flow path of adsorbate discharging from the emission canister 164 during a regeneration cycle based on a pressure within the emission canister 164. For example, as noted above, a temperature within the emission canister 164 may be increased during a regeneration cycle of the emission canister 164. In some embodiments, this increase in temperature may release adsorbate captured in the adsorbent 166 during the saturation cycle, thereby increasing a pressure within the emission canister 164. The pump control system 340 may monitor a pressure within the emission canister 164 using, for example, a third pressure sensor 354. The controller 342 may be configured to compare a pressure within the emission canister 164 to a pressure of refrigerant in the evaporator 38. If a pressure within the emission canisters 164 exceeds a pressure within the evaporator 38 by a threshold amount (e.g., 0.05 bar, 0.1 bar, 0.5 bar, 2 bar), the controller 342 may adjust the outlet valve 334 to a closed position and adjust a second outlet valve 356 to an open position. As shown in the illustrated embodiment of FIG. 22, the second outlet valve 356 is coupled to a second outlet conduit 358 that extends between and fluidly couples the evaporator 38 to the outlet conduit 332. Accordingly, adsorbate released from the emission canister 164 may flow through a portion of the outlet conduit 332, through the second outlet conduit 358, and into the evaporator 38 of the vapor compression system 14. That is, the adsorbate may flow from the emission canister 164 into the evaporator 38 without using a dedicated vacuum pump, such as the compressor 32, the central vacuum pump 330, or the like.

The controller 342 may monitor a pressure differential between the emission canister 164 and the evaporator 38 throughout the regeneration cycle of the emission canister 164. The controller 342 may adjust the outlet valve 334 to an open position and adjust the second outlet valve 356 to a closed position if a pressure within the emission canister 164 falls below a pressure within the evaporator 38, or falls within a threshold range of the pressure within the evaporator 38. Accordingly, the compressor 32 may generate a vacuum within the emission canister 164 and thereby facilitate drawing adsorbate from the emission canister 164 into the vapor compression system 14. Additionally or alternatively, the controller 342 may activate a vacuum pump (e.g., the central vacuum pump 330) to facilitate directing the adsorbate from the emission canister 164 to the evaporator 38, or any other suitable component of the vapor compression system 14. By employing the techniques discussed above, the controller 342 may ensure that a sufficient pressure differential is maintained to transfer adsorbate from the emission canister 164 to the evaporator 38.

Bilateral Regeneration System for Emission Canister

Conventional emission canisters typically include a single outlet conduit configured to enable the discharged adsorbate to be released during a regeneration cycle of the emission canister. For example, traditional emission canisters may include an outlet conduit disposed near an upper end portion of the emission canister. Accordingly, during a regeneration cycle, adsorbate released from the adsorbent 166 near a lower end portion of the emission canister traverses along nearly an entire length (e.g., a distance between the upper end portion to the lower end portion) of the emission canister before discharging through the outlet conduit. Unfortunately, this configuration may increase a duration for discharging the adsorbate from the emission canister, thereby reducing an operational efficiency of the purge system 100. Moreover, discharging released adsorbate from a single outlet conduit of the emission canister may increase a strain on a pump or heater used to facilitate the regeneration cycle of the emission canister, as fluid discharge from the emission canister is restricted.

Figure 23:
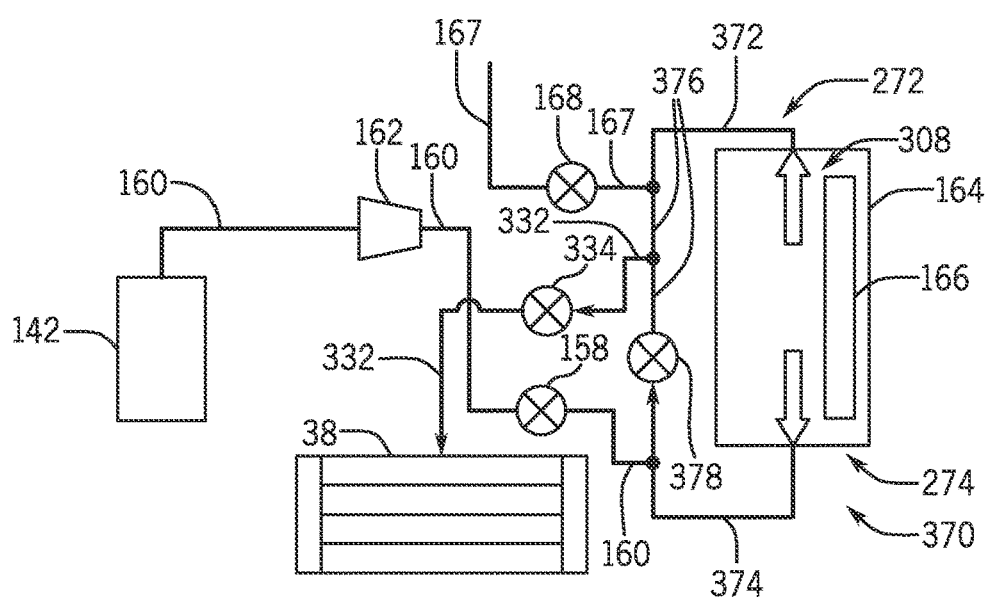
FIG. 23 is a schematic of an embodiment of a bilateral regeneration system of the emission canister, in accordance with an aspect of the present disclosure.

With the foregoing in mind, FIG. 23 is a schematic of an embodiment of a bilateral discharge system 370 that enables concurrent discharge of adsorbate from the first end portion 272 (e.g., an upper end portion) and the second end portion 274 (e.g., a lower end portion) of the emission canister 164 during a regeneration cycle of the emission canister 164. For example, the bilateral discharge system 370 includes a first connection conduit 372 and a second connection conduit 374 that are respectively coupled to the first end portion 272 and the second end portion 274 of the emission canister 164. Accordingly, the first and second connection conduits 372, 374 enable the entry or discharge of fluid from the interior 308 of the emission canister 164. As shown in the illustrated embodiment, the bilateral discharge system 370 includes an intermediate conduit 376 that fluidly couples the discharge conduit 160, the exhaust vent 167, and the outlet conduit 332. The bilateral discharge system 370 also includes a regeneration valve 378 disposed along a portion of the intermediate conduit 376 extending between the discharge conduit 160 and the outlet conduit 332.

During a saturation cycle of the emission canister 164, the discharge valve 158 and the exhaust valve 168 are in an open position, while the outlet valve 334 and the regeneration valve 378 are in a closed position. Accordingly, a gaseous mixture of refrigerant and non-condensable gases 138 may flow from the heat exchanger 142, through the discharge conduit 160, through the lower connection conduit 374, and into the emission canister 164. As such, the adsorbent 166 may adsorb refrigerant from the gas flow mixture, such that the non-condensable gases 138 may discharge into the ambient environment via the first connection conduit 372 and the exhaust vent 167. The gas flow mixture from the heat exchanger 142 cannot bypass the emission canister 164 because the regeneration valve 378 is in the closed position.

In a regeneration cycle of the emission canister 164, the discharge valve 158 and the exhaust valve 168 are in a closed position, while the outlet valve 334 and the regeneration valve 378 are in an open position. Accordingly, adsorbate released during regeneration of the emission canister 164 may concurrently discharge from the first and second end portions 272, 274 of the emission canister 164 via the first connection conduit 372 and the second connection conduit 374, respectively. The released adsorbate subsequently flows along the intermediate conduit 376, through the outlet conduit 332, and into the evaporator 38 (or another suitable component of the vapor compression system 14). In some embodiments, simultaneously discharging adsorbate from the first and second end portions 272, 274 of the emission canister 164 may significantly reduce a duration for removing released adsorbate from the emission canister 164, and thus, the duration of the regeneration cycle. Accordingly, the bilateral discharge system 370 may enhance an operational efficiency of the purge system 100. It should be appreciated that the bilateral discharge system 370 may be incorporated with any of the purge system 100 embodiments and/or features described herein.

Thermal Energy Recovery System for Emission Canister

As discussed above, the emission canister 164 may include one or more heating elements (e.g., electrical heating elements) that are configured to supply thermal energy (e.g., heat) to the adsorbent 166 during a thermal regeneration cycle and/or a combined regeneration cycle of the emission canister 164. These heating elements are generally operated using electrical energy supplied from a power supply of the vapor compression system 14 and/or a power supply of the purge system 100. A power consumption of the purge system 100 system may be reduced by recovering unused thermal energy from the vapor compression system 14 and using the recovered thermal energy to heat the adsorbent 166 during a regeneration cycle of the emission canister 164.

Figure 24:
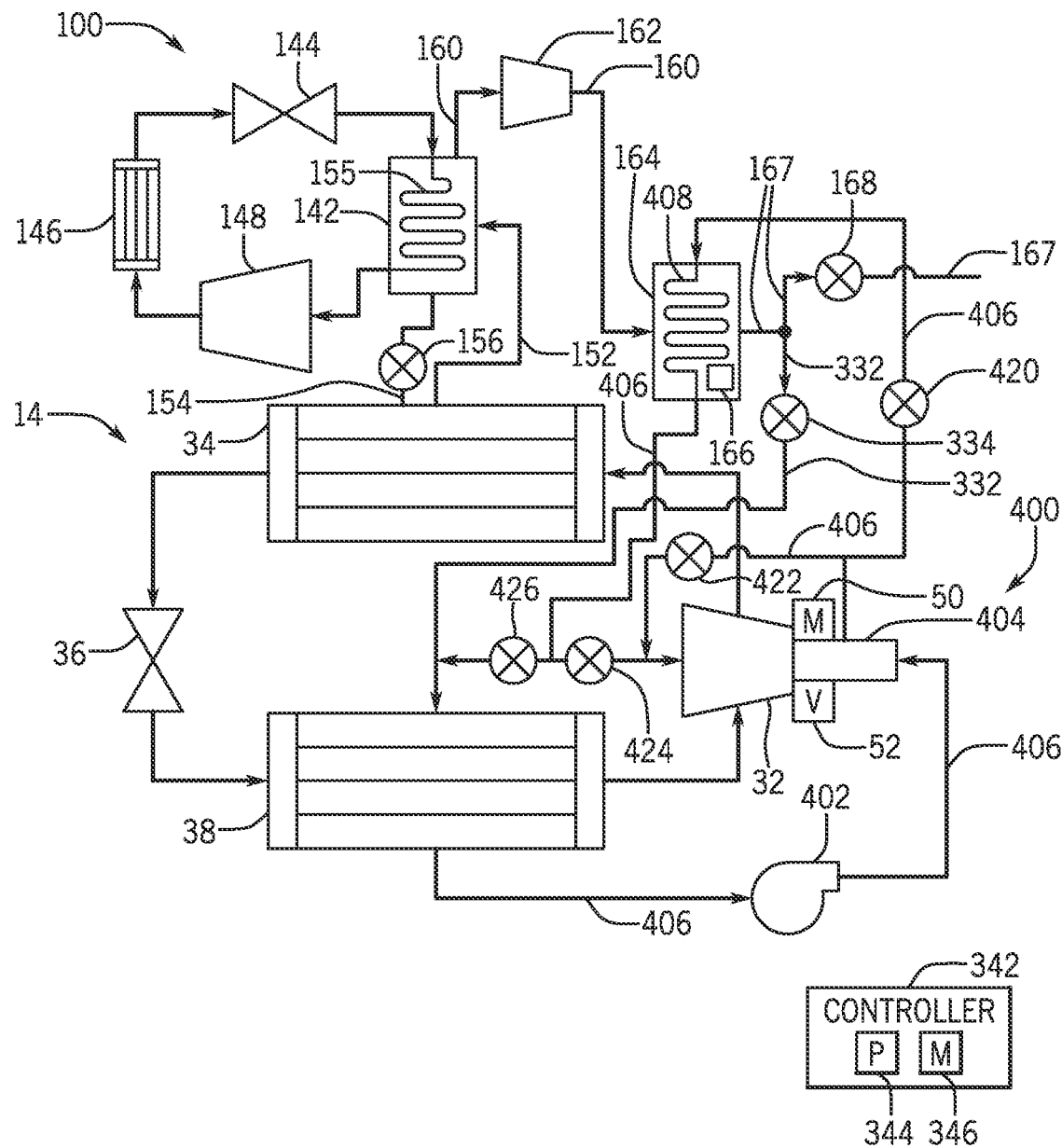
FIG. 24 is a schematic of an embodiment of the vapor compression system having an energy recovery system, in accordance with an aspect of the present disclosure.

With the foregoing in mind, FIG. 24 is a schematic of an embodiment of the purge system 100 that includes an energy recovery system 400 configured to recover waste thermal energy from the vapor compression system 14. In particular, the energy recovery system 400 is configured to transfer recovered thermal energy to remove the adsorbate from the emission canister 164 during a regeneration cycle of the emission canister 164. As show in the illustrated embodiment, the energy recovery system 400 includes a flow generating device 402 (e.g., a centrifugal pump) that is fluidly coupled to the evaporator 38 and a recovery heat exchanger 404 via a recovery conduit 406. The recovery conduit 406 also fluidly couples the recovery heat exchanger 404 to a recovery coil 408 disposed within, or otherwise in thermal communication with, the emission canister 164. The recovery conduit 406 also fluidly couples the recovery coil 408 to the compressor 32 (e.g., a suction side of the compressor 32) and the evaporator 38. The recovery system 400 may include a first recovery valve 420, a second recovery valve 422, and third recovery valve 424, and a fourth recovery valve 426 which are in fluid communication with various sections of the recovery conduit 406. As described in detail below, the first, the second, the third, and the fourth recovery valves 420, 422, 424, and 426 may cooperate to block a flow of heated refrigerant to the recovery coil 408 during a saturation cycle of the emission canister 164 and enable a flow of heated refrigerant to the recovery coil 408 during a regeneration cycle of the emission canister 164.

For example, during a saturation cycle of the emission canister 164, the controller 342 may adjust the first recovery valve 420, the third recovery valve 424, and the fourth recovery valve 426 to respective closed positions, while the second recovery valve 422 is adjusted to an open position. The controller 342 may subsequently activate the flow generating device 402 (e.g., a motor of the flow generating device 402). Accordingly, the flow generating device 402 may draw refrigerant from the evaporator 38 and direct the refrigerant toward the recovery heat exchanger 404. The recovery heat exchanger 404 may be in thermal communication with the motor 50 of the compressor 32, the VSD 52 of the compressor 32, or any other suitable compressor component configured to release thermal energy (e.g., heat) during operation of the vapor compression system 14. In this manner, refrigerant circulating through the recovery heat exchanger 404 may absorb thermal energy from, for example, the motor 50 of the compressor 32. The heated refrigerant exiting the recovery heat exchanger 404 may flow through the recovery conduit 406, the second recovery valve 422, and toward the compressor 32 (e.g., a suction side of the compressor 32), which recirculates the refrigerant through the vapor compression system 14 for reuse. In this manner, the recovery system 400 may be used to cool (e.g., remove thermal energy from) the compressor 32 during operation of the vapor compression system 14.

In some embodiments, the controller 342 may transition the first recovery valve 420 and the third recovery valve 424 to respective open positions upon receiving an indication that the emission canister 164 is in the regeneration cycle (e.g., upon initiation of the regeneration cycle). The controller 342 may also transition the second recovery valve 422 to a partially closed position or a fully closed position. Therefore, the flow generating device 402 may direct a portion of the heated refrigerant, or all of the heated refrigerant discharging from the recovery heat exchanger 404 toward the recovery coil 408 disposed within, or otherwise in thermal communication with, the emission canister 164. That is, the recovery coil 408 may be in thermal communication with the adsorbent 166. Accordingly, the adsorbent 166 may absorb thermal energy from the heated refrigerant flowing through the recovery coil 408. It should be noted that in some embodiments, the refrigerant within the recovery heat exchanger 404 may absorb sufficient thermal energy to change phase (e.g., boil), such that the refrigerant may discharge from the recovery heat exchanger 404 in a hot, gaseous phase. In such embodiments, the compressor 32 may facilitate drawing the refrigerant from the recovery heat exchanger 404 into the recovery coil 408 in addition to, or in lieu of, the flow generating device 402. That is, the compressor 32 may generate a pressure differential within the recovery conduit 406 to draw (e.g., via suction) gaseous refrigerant discharging from the recovery heat exchanger 404 through the recovery coil 408.

In any case, the heated refrigerant may flow through an interior of the emission canister 164 to transfer thermal energy to the adsorbent 166 disposed within the emission canister 164. That is, the adsorbent 166 may adsorb heat (e.g., thermal energy) from the heated refrigerant flowing through the recovery coil 408. In some embodiments, the thermal energy supplied by the refrigerant within the recovery coil 408 may be sufficient to enable regeneration of the emission canister 164 and release adsorbate from the adsorbent 166. Accordingly, the released adsorbate may be directed toward the evaporator 38 via the outlet conduit 332. In this manner, the energy recovery system 400 may enable the emission canister 164 to undergo thermal regeneration without using additional heating elements, such as the dual heating elements 232, 234. The cooled, or partially cooled gaseous refrigerant exiting the recovery coil 408 may flow through the recovery conduit 406, the third recovery valve 424, and toward the compressor 32, which recirculates the refrigerant through the vapor compression system 14 for reuse. In other embodiments, the cooled, or partially cooled refrigerant exiting the recovery coil 408 may flow toward any other suitable component of the vapor compression system 14.

For example, in some embodiments, the adsorbent 166 within the emission canister 164 may absorb sufficient thermal energy from the refrigerant such that the refrigerant may change phase, or condense, into a liquid state. In such embodiments, the third recovery valve 424 may be adjusted to a closed position (e.g., via the controller 342) while the fourth recovery valve 426 is adjusted to an open position (e.g., via the controller 342). Accordingly, condensed refrigerant, or partially condensed refrigerant exiting the recovery coil 408 may be directed to the evaporator 38 of the vapor compression system 14, rather than the compressor 32.

In some embodiments, the controller 342 may activate the flow generating device 402 only upon receiving an indication that the emission canister 164 is in the regeneration cycle. That is, the flow generating device 402 may remain inactive during, for example, the saturation cycle of the emission canister 164, and activate (e.g., via a signal sent by the controller 342) upon initiation of the regeneration cycle. In some embodiments, the controller 342 may instruct the dual heating elements 232, 234 to supply thermal energy to the emission canister 164 concurrently with the recovery coil 408 of the energy recovery system 400. For example, the controller 342 may activate the dual heating elements 232, 234 during initial start-up of the regeneration cycle when refrigerant circulating through the recovery coil 408 has a temperature that is insufficient to enable thermal regeneration of the emission canister 164 alone (e.g., after initial start-up of the flow generating device 402). In some embodiments, the controller 342 may be communicatively coupled to one or more sensors configured to provide the controller 342 with feedback indicative of a temperature of refrigerant circulating through the recovery conduit 406 and/or the recovery coil 408. As such, the controller 342 may deactivate the dual heating elements 232, 234 upon determining that the refrigerant circulating through the recovery coil 408 is at a temperature sufficient to support the thermal regeneration cycle of the emission canister 164 alone. In this manner, the energy recovery system 400 may reduce an electrical power consumption of conventional electrical heaters used to facilitate regeneration of the emission canister 164, and thus, improve an operating efficiency of the purge system 100.

The aforementioned embodiments of the emission canister 164 may be used separately on the vapor compression system 14 and/or the purge system 100, or in combination with one or more of the previously discussed embodiments. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A purge system for a vapor compression system, comprising:
    a heat exchanger configured to receive a flow of refrigerant and non-condensable gases from a condenser of the vapor compression system;
    a vacuum pump fluidly coupled to the heat exchanger and configured to draw gaseous refrigerant and non-condensable gases from the heat exchanger; and
    a controller configured to control operation of the vacuum pump based on comparison of a pressure within the condenser to an ambient pressure of an environment surrounding the vapor compression system.

2. The purge system of claim 1, wherein the controller is configured to reduce a speed of the vacuum pump in response to a determination that the pressure within the condenser exceeds the ambient pressure of the environment by a threshold amount.

3. The purge system of claim 1, wherein the controller is configured to deactivate the vacuum pump in response to a determination that the pressure within the condenser exceeds the ambient pressure of the environment by a threshold amount.

4. The purge system of claim 1, comprising:
    a first sensor communicatively coupled to the controller and configured to detect the pressure within the condenser; and
    a second sensor communicatively coupled to the controller and configured to detect the ambient pressure of the environment.

5. The purge system of claim 1, comprising an emission canister fluidly coupled to the vacuum pump and configured to receive the gaseous refrigerant and non-condensable gases from the vacuum pump.

6. The purge system of claim 5, wherein the controller is configured to adjust a flow path of refrigerant from the emission canister to the vapor compression system based on a pressure within the emission canister.

7. The purge system of claim 6, comprising a plurality of valves communicatively coupled to the controller, wherein the controller is configured to adjust the plurality of valves to direct refrigerant along the flow path from the emission canister to an evaporator of the vapor compression system in response to a determination that the pressure within the emission canister exceeds a pressure within the evaporator by a threshold amount.

8. The purge system of claim 7, the controller is configured to adjust the plurality of valves to direct refrigerant along the flow path from the emission canister to a compressor of the vapor compression system in response to a determination that the pressure within the emission canister falls below the pressure within the evaporator.

9. The purge system of claim 1, wherein the controller is configured to activate the vacuum pump, increase a speed of the vacuum pump, or both in response to a determination that the pressure within the condenser falls below the ambient pressure of the environment surrounding the vapor compression system.

10. The purge system of claim 1, wherein the controller is configured to activate the vacuum pump, increase a speed of the vacuum pump, or both in response to a determination that the pressure within the condenser is within a threshold range of the ambient pressure of the environment surrounding the vapor compression system.

11. The purge system of claim 1, comprising a sensor configured to detect an additional pressure within the heat exchanger, wherein the controller is configured to control operation of the vacuum pump based on the additional pressure within the heat exchanger.

12. A heating, ventilation, air conditioning, and refrigeration (HVAC&R) system, comprising:
    a vapor compression system comprising a condenser;
    a purge system configured to remove non-condensable gases from the vapor compression system;
    a heat exchanger of the purge system configured to receive a flow of refrigerant and non-condensable gases from the condenser;
    a vacuum pump of the purge system fluidly coupled to the heat exchanger and configured to draw gaseous refrigerant and non-condensable gases from the heat exchanger;
    an emission canister fluidly coupled to the vacuum pump, wherein the emission canister is configured to receive the gaseous refrigerant and non-condensable gases from the vacuum pump;
    a first sensor configured to detect a pressure within the condenser;
    a second sensor configured to detect an ambient atmospheric pressure external to the HVAC&R system; and
    a controller communicatively coupled to the vacuum pump, the first sensor, and the second sensor, wherein the controller is configured to:
        receive data indicative of the pressure within the condenser from the first sensor;

receive data indicative of the ambient atmospheric pressure from the second sensor;

compare the pressure within the condenser to the ambient atmospheric pressure; and adjust operation of the vacuum pump based on the comparison.

13. The HVAC&R system of claim 12, wherein the controller is configured to:

deactivate the vacuum pump or reduce a speed of the vacuum pump in response to a determination that the pressure within the condenser is greater than the ambient atmospheric pressure by a threshold amount.

14. The HVAC&R system of claim 13, wherein the controller is configured to evaluate a pressure differential between the pressure within the condenser and the ambient atmospheric pressure continuously or intermittently subsequent to deactivating the vacuum pump or reducing the speed of the vacuum pump.

15. The HVAC&R system of claim 14, wherein the controller is configured to reactivate the vacuum pump or increase the speed of the vacuum pump in response to a determination that the pressure within the condenser is falls below the ambient atmospheric pressure or falls within a threshold range of the ambient atmospheric pressure.

16. The HVAC&R system of claim 12, comprising a third sensor configured to detect a pressure within the heat exchanger, wherein the controller is configured to:

receive data indicative of the pressure within the heat exchanger from the third sensor;

compare the pressure within the heat exchanger to the ambient atmospheric pressure; and deactivate the vacuum pump in response to a determination that the pressure within the heat exchanger is greater than the ambient atmospheric pressure by a threshold amount.

17. The HVAC&R system of claim 12, comprising a third sensor configured to detect a pressure within the emission canister, wherein the controller is configured to:

receive data indicative of the pressure within the emission canister from the third sensor;

compare the pressure within the emission canister to the ambient atmospheric pressure; and deactivate the vacuum pump in response to a determination that the pressure within the emission canister is greater than the ambient atmospheric pressure by a threshold amount.

18. A controller for a heating, ventilation, air conditioning, and refrigeration (HVAC&R) system including a purge system and a vapor compression system, wherein the controller comprises:

a processor; and a memory device comprising processor-executable instructions stored thereon, wherein the processor-executable instructions, when executed by the processor, cause the processor to:

receive data indicative of a pressure within a condenser of the vapor compression system;

receive data indicative of an ambient atmospheric pressure external to the HVAC&R system;

compare the pressure within the condenser to the ambient atmospheric pressure; and in response to a determination that the pressure within the condenser exceeds the ambient atmospheric pressure by a threshold amount:

deactivate a vacuum pump of the purge system;

reduce a speed of the vacuum pump of the purge system; or both.

19. The controller of claim 18, wherein the processor-executable instructions, when executed by the processor, cause the processor to receive additional data indicative of an additional pressure within a heat exchanger of the purge system, wherein the heat exchanger is configured to receive a flow of refrigerant and non-condensable gases from the condenser of the vapor compression system, and the vacuum pump is configured to draw gaseous refrigerant and non-condensable gases from the heat exchanger.

20. The HVAC&R system of claim 12, wherein the emission canister is configured to direct at least a portion of the gaseous refrigerant to the vapor compression system.

* * * * *